(12) United States Patent  
Ai et al.

(10) Patent No.: US 9,994,098 B2  
(45) Date of Patent: Jun. 12, 2018

(54) MULTIMODE ELECTROMECHANICAL VARIABLE SPEED TRANSMISSION APPARATUS WITH SMOOTH MODE SHIFTING AND METHOD OF CONTROLLING THE SAME

(71) Applicants: Xiaolin Ai, Beijing (CN); Xiaozhi Ai, Guangdong (CN); Alan Jiang Ai, Canton, OH (US)

(72) Inventors: Xiaolin Ai, Beijing (CN); Xiaozhi Ai, Guangdong (CN); Alan Jiang Ai, Canton, OH (US)

( * ) Notice: Subject to any disclaimer, the term of this patent is extended or adjusted under 35 U.S.C. 154(b) by 206 days.

(21) Appl. No.: 15/104,134

(22) PCT Filed: Dec. 23, 2015

(86) PCT No.: PCT/US2015/000471  
§ 371 (c)(1),  
(2) Date: Jun. 13, 2016

(87) PCT Pub. No.: WO2017/111862  
PCT Pub. Date: Jun. 29, 2017

(65) Prior Publication Data  
US 2018/0037104 A1 Feb. 8, 2018

(51) Int. Cl.  
*F16H 3/12* (2006.01)  
*B60K 6/445* (2007.10)  
(Continued)

(52) U.S. Cl.  
CPC .............. *B60K 6/445* (2013.01); *B60K 6/365* (2013.01); *B60K 6/383* (2013.01); *B60K 6/387* (2013.01);  
(Continued)

(58) Field of Classification Search  
None  
See application file for complete search history.

(56) References Cited

U.S. PATENT DOCUMENTS 8,602,938 B1 12/2013 Conlon  
8,734,281 B2 5/2014 Ai  
(Continued)

FOREIGN PATENT DOCUMENTS

DE 102011089711 A1 * 6/2013 ............. B60K 6/365

*Primary Examiner* — Dirk Wright  
(74) *Attorney, Agent, or Firm* — Lucas & Mercanti, LLP

(57) ABSTRACT

A multi-mode electro-mechanical variable speed transmission capable of providing two power split operation modes and at least one fixed output-to-input speed ratio operation mode. The transmission includes an input shaft, an output system, at least one planetary gear set having at least a first, second and third co-axial rotatable components, two electric machines, and at least one torque transfer device. The first co-axial rotatable component couples to the first electric machine with a constant speed ratio; the second co-axial rotatable component couples to the output system with a constant speed ratio; and the third co-axial rotatable component couples to the input shaft with a constant speed ratio; the second electric machine selectively couples to two different co-axial rotatable components of the planetary gear set with two different speed ratios. The transmission is configured to unload the torque transfer device, adjust engine power, shift one of the electric machines to a freewheeling state, and actively synchronize the speed of the electric machines with the speed of one of the engagement positions of the torque transfer device.

27 Claims, 19 Drawing Sheets

(51) Int. Cl.
*B60K 6/387* (2007.10)
*B60K 6/383* (2007.10)
*B60K 6/365* (2007.10)
*F16H 3/72* (2006.01)
*F16H 3/66* (2006.01)

(52) U.S. Cl.
CPC ............... *F16H 3/12* (2013.01); *F16H 3/66* (2013.01); *F16H 3/728* (2013.01); *F16H 2200/2005* (2013.01); *F16H 2200/2007* (2013.01); *F16H 2200/2023* (2013.01); *F16H 2200/2035* (2013.01); *F16H 2200/2038* (2013.01); *F16H 2200/2066* (2013.01); *F16H 2200/2097* (2013.01)

(56) References Cited

U.S. PATENT DOCUMENTS

| | | | |
|---|---|---|---|
| 9,108,624 B2 | 8/2015 | Xue | |
| 9,187,087 B2* | 11/2015 | Martin | B60W 20/40 |
| 2015/0292600 A1* | 10/2015 | Ai | B60K 6/365 |
| | | | 475/5 |
| 2018/0037104 A1* | 2/2018 | Ai | B60K 6/445 |

\* cited by examiner

MULTIMODE ELECTROMECHANICAL VARIABLE SPEED TRANSMISSION APPARATUS WITH SMOOTH MODE SHIFTING AND METHOD OF CONTROLLING THE SAME

BACKGROUND OF THE INVENTION

The invention is related to a multi-mode electro-mechanical variable speed transmission in a powertrain, and to a method of operating the transmission and the powertrain. More specifically, it is related to a multi-mode electro-mechanical variable speed transmission with load free clutch shifting between different modes of operation. It is applicable to a wide variety of vehicles and power equipment.

To reduce fuel consumption and emission, hybrid vehicles combine an electric power plant with a conventional internal combustion engine. The internal combustion engine operates in a certain range of speed and power. Inside this range, there usually exists a smaller regime where the engine archives the best performance. On the other hand, however, driving conditions vary enormously, not only in wheel speed but also in driving torque at the drive wheels. A combination of a given speed and torque defines a power state. Selectively operating the internal combustion engine and matching its power state with that of the drive wheels are the primary functions for a hybrid transmission.

The development of hybrid technology provides new avenues for achieving improved operation and match of power state of the internal combustion engine with the drive wheels. Among various power-train architectures, a well-known design is the electro-mechanical continuous variable transmission, known as Toyota hybrid system, or THS. THS allows for electric propulsion at low power and slow speed operation and turns on the engine in hybrid operation when vehicle speed and or power demands exceed certain thresholds. In the hybrid operation, THS splits the input power into two different power paths. Part of the input power passes through a so-called mechanical power path which is comprised of mechanical gears and shafts; the rest of the input power passes through an electric power path which contains electric machines, inverters and battery packs linked by electric cables. The device used to split the power is a simple planetary gear system. THS offers one power split mode and provides a single output to input speed ratio node point SR where one the electric machines is zero rotational speed. This node point is referred to as speed ratio node or speed node. When the transmission operates at a speed ratio higher than the speed node, internal power circulation occurs. One of the power paths passes more power than what is transmitted through the transmission. Internal power circulation reduces the efficiency of the transmission and, to a large extent, constrains the effective operating speed ratio range of the transmission. For high power vehicle applications, the torque and power ratings for the electric machines have to be increased significantly. In the electric drive mode, only one of the electric machines provides motive power. This makes THS not suitable for all electric drive in power demanding applications. Examples of such applications are all electric range (AER) plug-in hybrid configurations where the vehicles operate in pure electric mode till the battery charge is depleted below a predetermined threshold.

U.S. Pat. No. 8,734,281, U.S. Pat. No. 9,108,624 and US application 2015/0292600 disclosed multi-mode electro-mechanical variable speed transmissions that overcome the aforementioned drawbacks of prior art. These transmissions provide much improved fuel efficiency and performance characteristics; they can operate under multiple operation modes including two different power split modes, and offer higher power transmission efficiency by avoiding internal power circulation. These transmissions are capable of providing continuously variable output to input speed ratio and independent power regulation with significantly extend the operational speed ratio range. These transmissions may also be operated in pure electric modes with much improved acceleration performance, and fixed speed ratio modes with maximum transmission efficiency.

Switching between different power splitting modes is achieved through a clutch or clutches, referred to as torque transfer device or devices. Hydraulic actuated frictional clutch is often adopted for its smooth engagement and disengagement quality. Frictional clutch allows the components to be connected to engage under sliding conditions. The torque transfer between the connecting components is established gradually during the engagement process. This leads to a smooth shifting between different modes of operation for the transmission. The major disadvantage of frictional clutch is high power loss due to frictional heat generation in the slippage phase of the engagement and parasitic loss due to churning and drag of fluid in the hydraulic system.

General motors' Chevy Voltec is an example of using frictional clutch for mode shifting in the hybrid transmission. The transmission architecture for the second generation Voltec was disclosed in U.S. Pat. No. 8,602,938.

Positive engagement clutch, such as a dog clutch is desirable for its simplicity, high efficiency and high torque capability. However, this type clutch needs speed synchronization between the components to be connected before clutch engagement is commenced. A major disadvantage with positive engagement clutch is the impact load that the transmission experiences when shifting under torque load. For this reason, dog clutches are mostly used in coordination with a frictional clutch, as seen in manual or automated manual transmissions, to provide torque or power interruptive gear shifting.

In U.S. Pat. No. 8,734,281, U.S. Pat. No. 9,108,624 and US application 2015/0292600, shifting between different modes of operation was recommend to take place at speed ratio nodes where components to be connected are self-synchronized. To facilitate the mode shifting and to reduce or avoid impact load related drive torque disturbance, self-synchronization has to be closely maintained. This requires the transmission to keep its output-to-input speed ratio at a constant as close as possible during mode shifting.

BRIEF SUMMARY OF THE INVENTION

One of the objectives of current invention is to provide novel multi-mode electro-mechanical variable speed transmissions that facilitate non power-interruptive shifting between operation modes using simple, compact and highly efficient positive engagement clutches. These transmissions can operate under at least two different power split modes, offering higher power transmission efficiency by avoiding internal power circulation. These transmissions are capable of providing continuously variable output-to-input speed ratio and independent power regulation with significantly extended operational speed ratio range. These transmissions may also be operated in two pure electric modes with much improved acceleration performance, and at least one fixed speed ratio mode with maximum transmission efficiency.

Another objective of the current invention is to provide a means of shifting between power split modes using simple, compact and highly efficient positive engagement clutch or clutches to achieve smooth shifting quality without requiring the transmission to maintain a constant speed ratio during shifting.

Yet another objective of the current invention is to substantially maintain drive torque and output power from the transmission and prevent the drive torque and power from being undisturbed during the mode shifting.

To achieve above objectives, the current invention provides following technical solution: A multi-mode electro-mechanical variable speed transmission includes a gear system, an input shaft, an output system, at least one torque transfer device, and two electric machines along with their electric drives and controllers. The gear system further includes at least one planetary gear set having at least three co-axial rotate-able members or components. The multi-mode electro-mechanical variable speed transmission is provided with a means for mode shifting through the at least one torque transfer device. The at least one torque transfer device is a positive engagement clutch including a neutral position and at least two engagement positions. The mode shift means includes shifting one of the electric machines to a freewheeling state where its rotation speed can be independently controlled from the speed control of the other electric machine. The mode shifting means further includes setting a target speed for the one of the electric machines and synchronizing the speed of the one of the electric machines with the target speed. The mode shifting means further includes setting torque of the electric machines such that the at least one torque transfer device is substantially free from torque load during shifting. The mode shifting means also includes adjusting engine power such that the drive torque and power output from the transmission is substantially undisturbed and maintains at the desired values.

For those skilled in the art, a planetary gear set can be described and understood in a lever diagram format. A lever diagram is a schematic representation of the components of a planetary gear set. It defines kinematic and dynamic relationships between these components. The lever diagram contains a lever or a bar and a number of knots. Each knot corresponds to a co-axial rotate-able component of the planetary gear set. The inter-distances between the knots are determined by gear ratio or ratios of the planetary gear set. The knots from one end of the lever to the other end of the lever are consecutively referred to as the first, the second, third knots and so on. The rotation speed of the co-axial rotate-able components of the planetary gear set are represented by vectors that start from the corresponding knots and are perpendicular to the lever. A multi-knot lever diagram has two degrees of freedom: the speeds of any two knots uniquely determine the speed of the remaining knots. The ends of all rotation speed vectors on a lever diagram lay on a straight line referred to as dynamic collinear line.

A lever with three knots represents a three-shaft planetary gear set, also known as the three-branch gear set having three co-axial rotate-able components. FIG. 1 shows a three-knot lever diagram. The three knots from left to right are referred to as the first ($KN_{11}$), the second ($KN_{12}$) and the third ($KN_{13}$) knots, respectively. Each knot corresponds to a branch or a co-axial rotatable component of the planetary gear set. The three branches are referred according to their corresponding knots to as the first, the second and the third branches of the planetary gear set. The inter-distance between the first and second knots is one unit in length, the inter-distance between the second and third knots is $K_a$ unit in length. $K_a$ is the gear teeth ratio (also known as gear ratio) of ring gear to sun gear for a simple planetary gear set. It is the characteristic parameter of the planetary set.

A lever with four knots represents a four-shaft planetary gear set, also known as the four-branch gear set having four co-axial rotate-able components. FIG. 2 shows a four-knot level diagram. The four knots from left to right are referred to as the first ($KN_{21}$), the second ($KN_{22}$), the third ($KN_{23}$) and the fourth ($KN_{24}$) knots, respectively. Each knot corresponds to a branch or a co-axial rotatable component of the planetary gear set. The four branches are referred according to their corresponding knots to as the first, the second, the third and the fourth branches of the planetary gear set. The inter-distance between the first and third knots is $K_b$ unit in length; the inter-distance between the second and third knots is $K_a$ unit in length and the inter-distance between the third and fourth knots is one unit in length, where $K_a$ and $K_b$ are gear teeth ratios of the four-branch planetary gear set. They are the characteristic parameters of the four-branch planetary gear set.

A pair of gears with external or internal meshing engagement can also be represented by a special three-knot lever diagram with one of the knots being fixed to the ground as illustrated by a triangular symbol (see FIG. 3). Such lever diagram is considered as two-knot lever diagram and has only one degree of freedom since one of the knots is grounded and always remains stationary.

As understood by those skilled in the art, a torque transfer device can include any type of clutch including one-way clutch. Furthermore an engagement position in a torque transfer device also refers to a mechanical component that is associated with the engagement position and thus moves or rotates with that position.

For sake of discussion, the term motive power used throughout the disclosure refers to the power that is directly related to propelling or stopping the vehicle.

In one embodiment of current invention, the transmission further includes a stationary member, and the gear system is configured with a first three-knot lever and a second four-knot lever. The first knot of the first lever couples to the stationary member and the second knot of the first lever couples to the second knot of the second lever. The gear system is connected to the input shaft, the output system, and to the first and second electric machines in the following configuration (see FIG. 4): the third knot of the first lever selectively connects and disconnects the second electric machine through the at least one torque transfer device or clutch; the first knot of the second lever connects to the first electric machine; the second knots of the first and second levers connect to output system; the third knot of the second lever connects to the input shaft and the fourth knot of the second lever selectively connects to and disconnects from the second electric machine.

Alternatively, the gear system is configured with a first three-knot lever and a second three-knot lever. The first knot of the first lever couples to the stationary member and the second knot of the first lever couples to the second knot of the second lever. The gear system is connected to the input shaft, the output system, and to the first and second electric machines in the following configuration: the third knot of the first lever selectively connects to and disconnects from the second electric machine through the at least one torque transfer device or clutch; the first knot of the second lever connects to the first electric machine; the second knots of the first and second levers connect to output system; the third knot of the second lever connects to the input shaft and selectively connects to and disconnects from the second electric machine.

The multi-mode electro-mechanical variable speed transmission may further include a counter shaft. The rotatable connection between the gear system and output system is established through the counter shaft.

The multi-mode electro-mechanical variable speed transmission may further include a one-way clutch that engages in one direction and disengages in the opposite direction to allow one connecting member to transfer torque to another connecting member in one-direction only. As mention previously, clutch and one-way clutch are referred generically to as torque transfer devices. Through coordinated operation of the torque transfer devices and control of electric machines, the transmission can be operated in multiple operating modes, including a first electric drive mode where one of the electric machines provide motive power, a second electric drive mode where two electric machines work together to provide improved motive power, a first hybrid drive mode where the engine is on and the transmission is operated with continuously variable speed ratio in a low output-to-input speed ratio range, a second hybrid drive mode where the engine is on and the transmission is operated with continuously variable speed ratio in a high output-to-input speed ratio range, and at least a fixed speed ratio drive mode where the output-to-input speed ratio of the transmission is a constant. The fixed speed ratio operation mode may be deemed desirable for special applications.

The multi-mode electro-mechanical variable speed transmission can be operated under pure electric drive modes with engine being turned off to meet all electric drive range requirements. When operating under electric only modes, the at least one torque transfer device or clutch selectively connects the second electric machine to the third knot of the first lever and disconnects the second electric machine from the fourth knot of the second lever. The second electric machine provides drive torque and motive power to output system to propel the vehicle. The first electric machine provides a reaction torque to balance the any torque from the engine and to keep the engine at zero speed or a predetermined speed. When equipped with the optional one-way clutch at the third knot of the second lever or at the input shaft, the transmission can utilize both the first and second electric machines to provide drive torque and motive power to the output system to propel the vehicle for improved acceleration and enhanced power performance. The one-way clutch prevents the engine from rotating in reverse direction and provides a reaction torque to balance the drive torque of the first electric machine. This allows for the first electric machine to provide drive torque and motive power in tandem with the second electric machine to propel the vehicle. This operation mode may be required for plug-in hybrid vehicles with high demands on all electric drive range (AER) and performance specifications.

During operation, the multi-mode electro-mechanical variable speed transmission is capable of switching or shifting between various operating modes. When shifting between two hybrid operation modes, the second electric machine selectively couples to different knots or different knot sets of the levers via the at least one torque transfer device or clutch to realize two different power split configurations. The torque transfer device or clutch includes one neutral position (as shown in FIG. 5 for example) and two engagement positions (as shown in FIGS. 4 and 6 for example). The shifting is carried out in two main steps: The first step is to unload the torque transfer device or clutch by controlling the torque of at least one of the electric machines and then disengage the clutch, freeing the second electric machine from rotation speed constraint imposed by input shaft and output system (engine and drive shaft). The second step is to synchronize the second electric machine with the incoming component that the second electric machine is intended to connect, and then engage the clutch, connecting the second electric machine with the intended component in accordance with the operating mode of the transmission. In the process of synchronization, the second electric machine is controlled independently from the first electric machine. In fact, the two electric machines are controlled in different speed feedback loops. To ensure the drive torque and output power from the transmission to the vehicle are substantially undisturbed, engine power may be adjusted to a predetermined value in accordance with the output-to-input speed ratio of the transmission and current operation conditions through a concrete algorithm. The predetermined value for engine power adjustment can also be obtained from experimental testing. To reduce the effort of synchronization, it is recommended to shift, at or in vicinity of, the speed ratio node of the transmission where at least one of the electric machines is at zero speed.

In one embodiment, the speed of the third knot of the first lever and the speed of the fourth knot of the second knot occurred are self-synchronized at the first speed node where the speed of the first electric machine is zero. To ensure the speed self-synchronization, the gear ratio of the first lever $K_s$ and the gear ratios of the second lever $K_a$ and $K_b$ must satisfy a predetermined proportional relationship. This relationship is set forth $$K_s = \frac{K_a + 1}{K_b - K_a} \qquad (1)$$

The introduction of a neutral position for the torque transfer device or clutch allows the speed of the second electric machine to be controlled independently, freeing from constraint of the gear system whose speeds are controlled by the first electric machine. This along with a concrete procedure permits the actual shifting between the different power split modes to be carried out at any speed ratio even with a dog clutch. The speed ratio may or may not coincide with the first speed node. During the mode shifting event, the torque of the second electric machine is made to be essentially zero. Thus, no torque impact exerts on the clutch, minimum actuation effort is required to engage and disengage the clutch. Additionally, the engine power is adjusted with respect to charge or discharge power of the energy storage device to maintain the required output power from the transmission to propel the vehicle. The amount of power adjustment for the engine in relation to the charging or discharging power of the battery is determined based on the deviation of actual mode switching speed ratio from speed ratio node of the transmission. All these measures lead to a smooth, continuous and non-interruptive mode shifting of the transmission in terms of speed, drive torque and output power for the vehicle.

The current invention also provides a method for designing, producing and operating the multi-mode electro-mechanical variable speed transmission. The method includes following steps:
(1) Designing and producing a gear system; the gear system includes at least one first planetary gear set having at least three co-axial rotatable components each being represented by a knot on a corresponding lever diagram.

(2) Designing and producing a first and a second electric machine; the maximum continuous power ratings of the electric machines are set to be no less than $P_{EM}$.

(3) Designing and producing an input shaft capable of transmitting a maximum power no less than $P_{in}$.

(4) Designing and producing an output system; the output system further includes at least one drive shaft.

(5) Designing and producing at least one torque transfer device having one neutral position for shifting one of the electric machine to a freewheel state; the torque transfer device may further include at least two engagement positions.

(6) Coupling the first electric machine to a first co-axial rotatable component of the at least one planetary gear set.

(7) Coupling the output system to a second co-axial rotatable component of the at least one planetary gear set.

(8) Coupling the input shaft to a third co-axial rotatable component of the at least one planetary gear set.

(9) Coupling the second electric machine to one of the co-axial rotatable components of the at least one planetary gear set with a fixed speed ratio, and selectively couples it to another co-axial rotatable component of the at least one planetary gear set via the torque transfer device. Or as an alternative, selectively coupling the second electric machine to one of the co-axial rotatable components of the at least one planetary gear set via the torque transfer device with a fixed speed ratio, or to another co-axial rotatable component of the at least one planetary gear set via the torque transfer device with a second speed ratio.

(10) Operating the transmission in at least two hybrid modes of operation.

(11) Shifting between the hybrid modes of operation through the at least one torque transfer device by unloading the torque transfer device and then shifting one of the electric machines to a freewheeling state where the electric machine is free from speed constraint imposed by the gear system, and free from torque load exerted by the gear system.

(12) Setting a target speed for the second electric machine based on speed of one of the two engagement positions of the torque transfer device, and actively controlling and synchronizing the speed of the second electric machine with the target speed, Connecting the second electric machine with the one of the two engagement positions of the torque transfer device once the synchronization is confirmed.

(13) Adjust engine power in accordance with the output-to-input speed ratio of the transmission and the required drive power of the vehicle during mode shifting such that the output torque and drive power of the transmission is substantially undisturbed.

Above mentioned technical solution has following benefits: it provides a novel multi-mode electro-mechanical variable speed transmission with improved efficiency and drive comfort and reduced cost. It allows the use of simple, compact and more efficient torque transfer device for shifting between operation modes and prevents drive torque and power interruption at the output of the transmission. The transmission offers smooth and continuous variable speed operation over a wide range from reverse to stop and to forward, without requiring the frictional clutches and conventional launching device. It significantly improves the overall efficiency of the vehicle.

BRIEF DESCRIPTION OF ACCOMPANYING DRAWINGS

In the accompany drawings which form part of the specification:

DESCRIPTION OF THE PREFERRED EMBODIMENTS

The current invention can have various embodiments, variants and configurations that incarnate the spirit of current invention. Embodiments, variants and configurations disclosed thereafter in text and in illustrations are used for the purpose of explanation only and shall not be interpreted as limitation to the scope of current invention. The following detailed description illustrates the invention by way of example and not by way of limitation.

Figure 1:
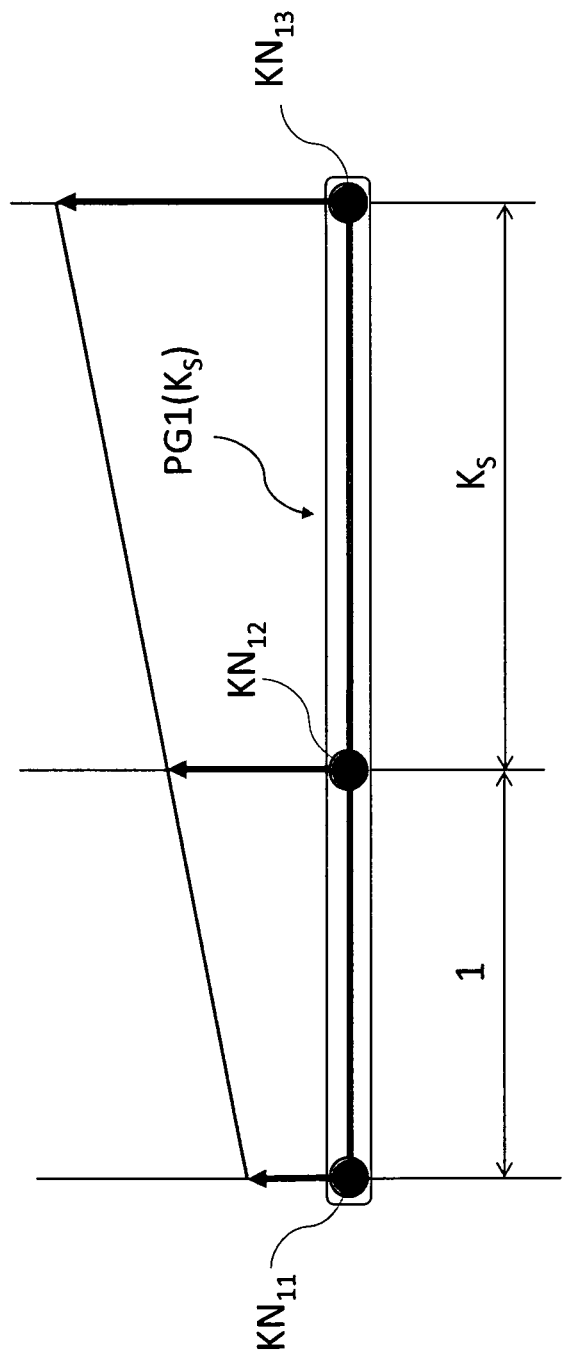
FIG. 1 is a three-knot lever diagram that represents a three-branch planetary gear set, describing the rotational speed relationship among the three co-axial rotating components of the gear set.

FIG. 1 shows a three-knot lever diagram, representing a three-branch planetary gear set PG1 ($K_s$). The three-branch planetary gear set has three co-axial rotatable components, the ring gear, the planet carrier and the sun gear. They are represented respectively by the three knots on the three-knot lever. From left to right (or from right to left), these three knots are referred to as the first knot ($KN_{11}$), the second knot ($KN_{12}$) and the third knot ($KN_{13}$), respectively. The inter-distance between the first and second knots in the lever diagram is one unit in length; the inter-distance between the second knot and the third knot is $K_s$ unit in length wherein $K_s$ is the gear teeth ratio of the ring gear to the sun gear. The gear ratio $K_s$ is a characteristic parameter that fully defines the three-knot lever.

Figure 2:
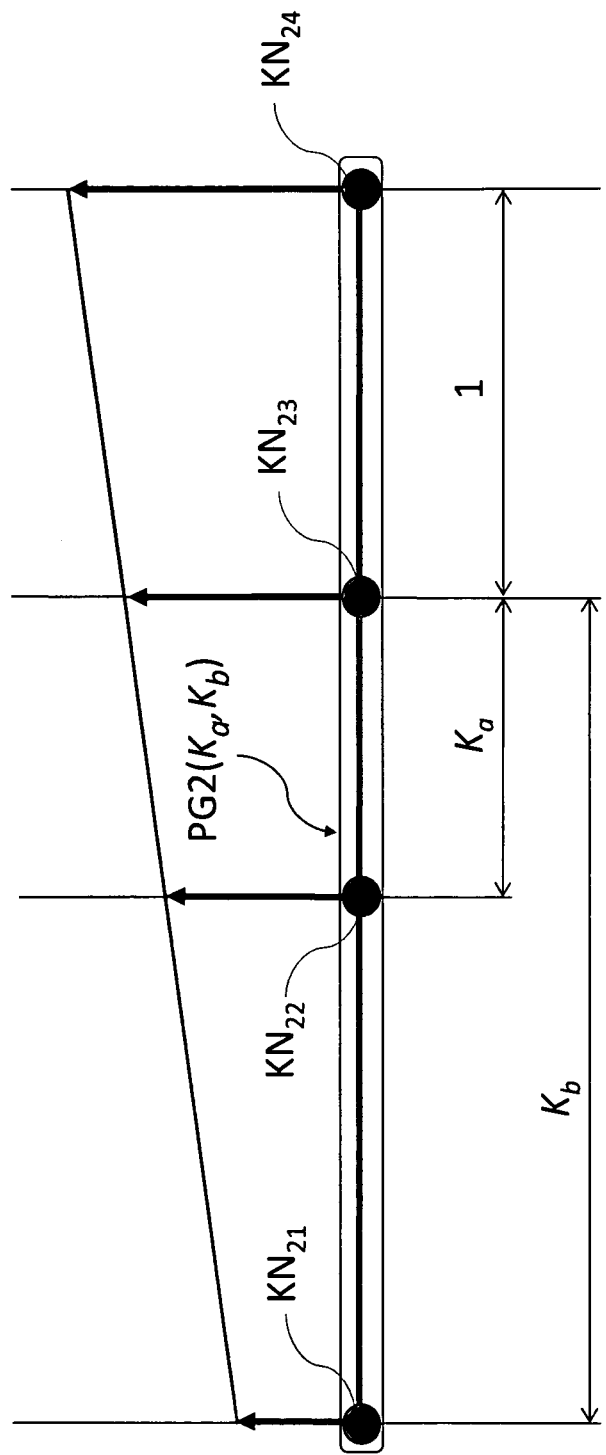
FIG. 2 is a four-knot lever diagram that represents a four-branch planetary gear set, describing the rotational speed relationship among the four co-axial rotating components of the gear set.

FIG. 2 shows a four-knot lever diagram, representing a four-branch planetary gear set PG2($K_a$, $K_b$). The four-branch gear set has four co-axial rotatable components each being represented by a knot on the four-knot lever. For left to right (or from tight to left), these four knots are referred to as the first knot ($KN_{21}$), the second knot ($KN_{22}$), the third knot ($KN_{23}$) and the fourth knot ($KN_{24}$), respectively. The inter-distance between the first and third knots is $K_b$ unit in length; the inter-distance between the second and third knots is $K_a$ unit in length and the inter-distance between the third and fourth knots is one unit in length wherein $K_a$ and $K_b$ are gear teeth ratios of the four-branch planetary gear set. $K_a$ and $K_b$ are characteristic parameters that fully define the four-knot lever. That is to say, the performance characteristics of the four-branch planetary gear set are uniquely defined by the characteristic parameters $K_a$ and $K_b$. The relationships between the parameters $K_a$, $K_b$ and the teeth numbers of the associated gears of the corresponding planetary gear set are determined by the actual structure of the planetary gear set.

It should be understood that a lever diagram is a schematic representation of a planetary gear set wherein the co-axial rotatable components of planetary gear set are each represented by a knot on the lever diagram. The lever diagram can be used to graphically describe rotation speeds among the co-axial rotatable components. Those having ordinary skill in the art will recognize that when referring a knot on a lever diagram, it is equivalent to referring the corresponding co-axial rotatable component of the planetary gear set which the lever diagram is representing and vice versa. Those having ordinary skill in the art will understand that the terms such as "couple", "connect" and "engage" are used to represent fixed mechanical connections or rotatable meshing engagements (though a pair of gears for example) between two or more mechanical components to transmit torque and mechanic power. These terms are also used to represent electric connections between two or more electric components to transmit electric power. Mechanical couplings or connections between the various members or components are illustrated by solid lines in the lever diagram.

Figure 3:
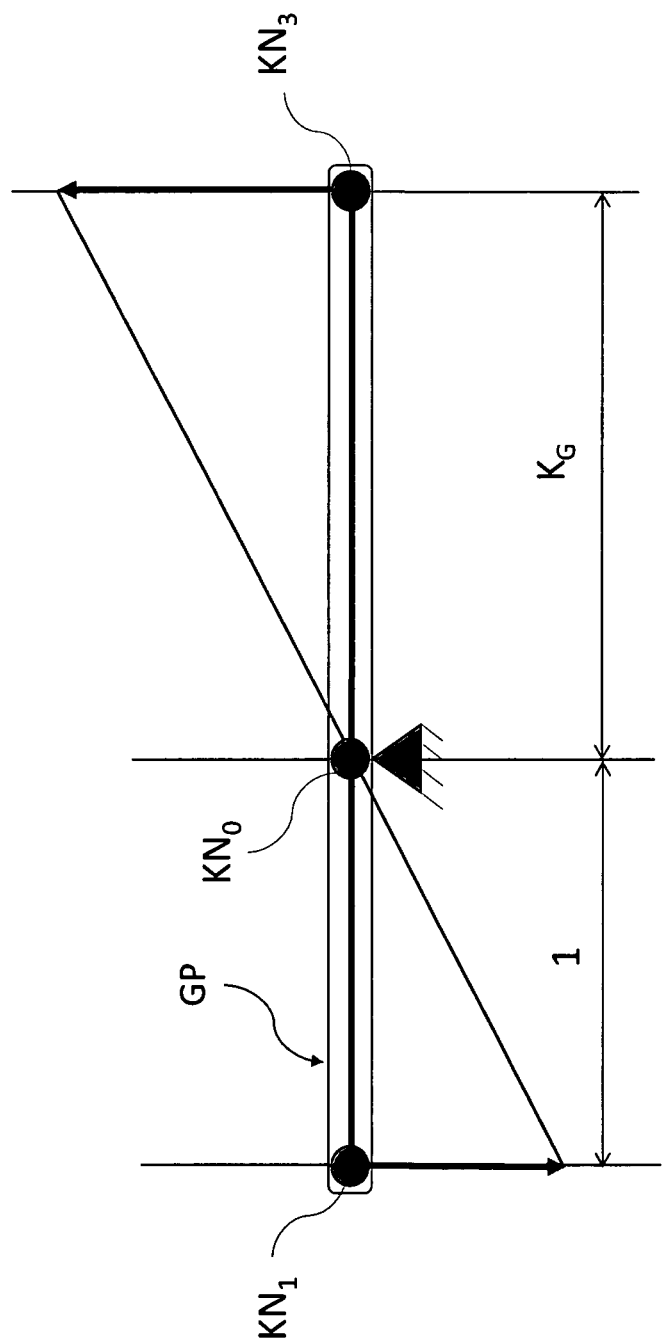
FIG. 3 is a special lever diagram with a fixed knot that represents a pair of external meshing gears.

FIG. 3 shows a special three-knot lever diagram with the middle knot being fixed to the ground or a stationary member. This lever diagram is used to represent a pair of gears in externally meshing engagement. The inter-distance between the first knot and the second knot (middle knot) is one unit in length; the inter-distance between the second and third knots is $K_G$ unit in length wherein $K_G$ is the teeth ratio of the two gears. Likewise, a pair of gears in an internal meshing engagement can be represented by a special three-knot lever diagram with one of the end knot being fixed. A special three-knot lever with one knot being fixed can be and is often referred to as a two-knot lever. It has one degree of freedom.

Figure 4:
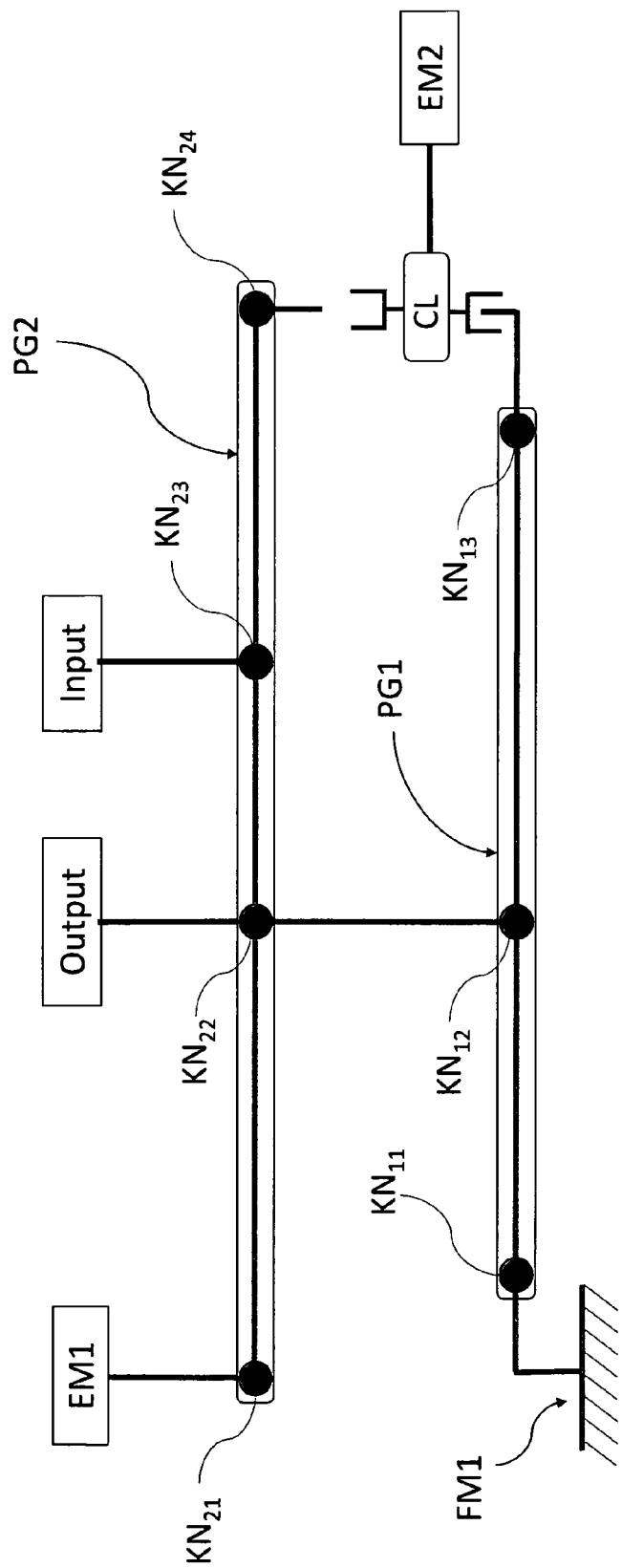
FIG. 4 is a schematic lever diagram of a preferred embodiment (embodiment 1) of multi-mode electro-mechanical variable speed transmission of the current invention, showing a torque transfer device in first engagement position.
Figure 5:
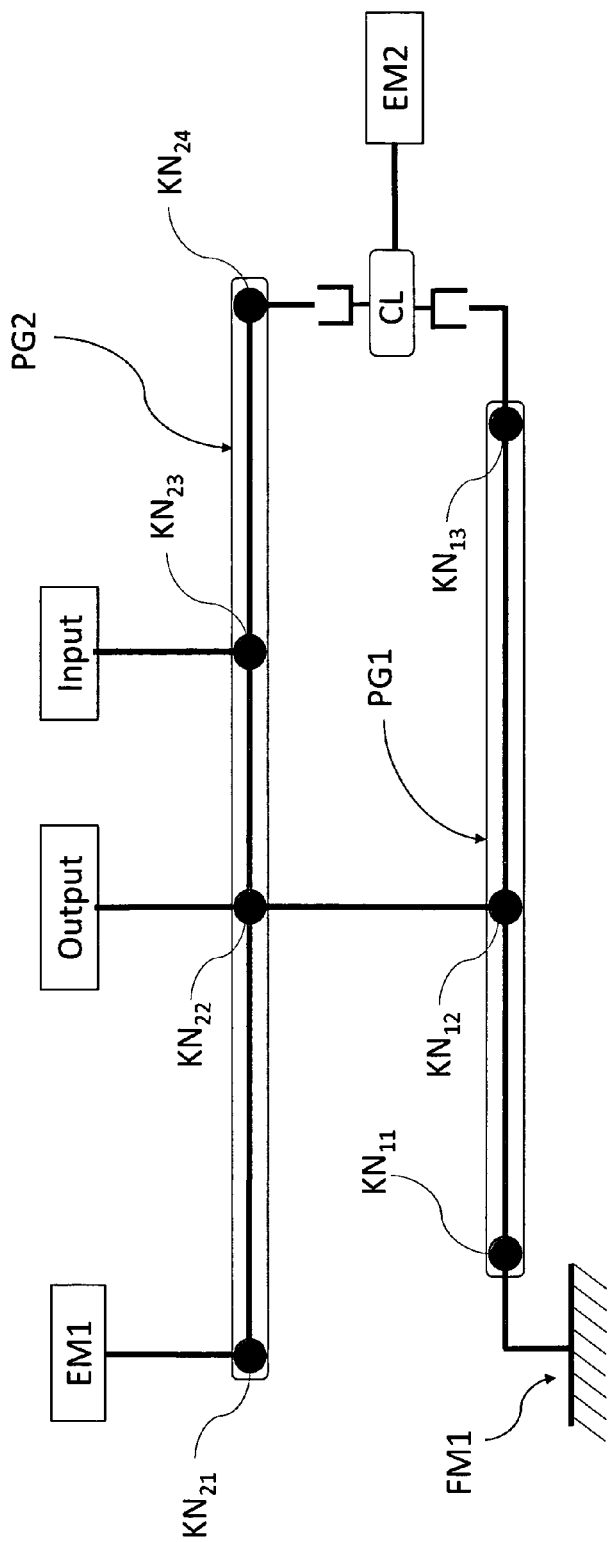
FIG. 5 is a schematic lever diagram of the preferred embodiment (embodiment 1) of multi-mode electro-mechanical variable speed transmission of the current invention, showing the torque transfer device in neutral position.
Figure 6:
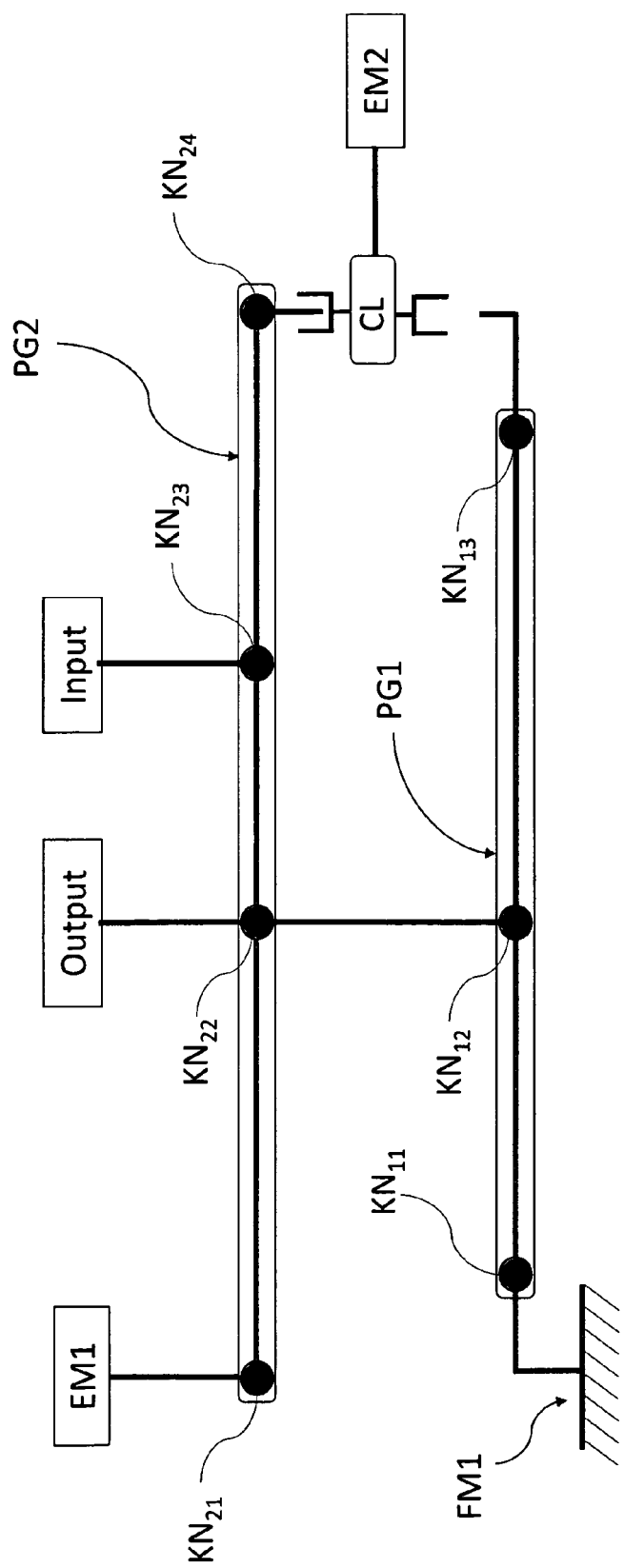
FIG. 6 is a schematic lever diagram of the preferred embodiment (embodiment 1) of multi-mode electro-mechanical variable speed transmission of the current invention, showing the torque transfer device in second engagement position.

FIGS. 4 to 6 show a preferred embodiment, the embodiment 1 of current invention. The embodiment is illustrated in the lever diagram format. The multi-mode electro-mechanical variable speed transmission is comprised of a gear system including a first planetary gear set (PG1) represented by a first lever and a second planetary gear set (PG2) represented by a second lever, an input shaft (Input), an output system (Output), at least one clutch (CL), a first stationary member (FM1), and a first and second electric machines (EM1, EM2) along with their associated drives and controllers (see FIG. 19).

The first planetary gear set (PG1) is a three-branch planetary gear set, having a first co-axial rotatable component, a second co-axial rotatable component and a third co-axial rotatable component each being represented by a first knot ($KN_{11}$), a second knot ($KN_{12}$) and a third knot ($KN_{13}$) of the first lever, respectively. The second planetary gear set (PG2) is a four-branch planetary gear set, having a first, a second, a third and a fourth co-axial rotatable components that are represented by a first, a second, a third and a fourth knots ($KN_{21}$, $KN_{22}$, $KN_{23}$, and $KN_{24}$) of the second lever, respectively. The first knot ($KN_{11}$) of the first lever (PG1) connects to the stationary member (FM1). The second knot ($KN_{12}$) of the first lever (PG1) connects to the second knot ($KN_{22}$) of the second lever (PG2) such that the second knot ($KN_{12}$) of the first lever (PG1) rotates at the same rotational speed as the second knot ($KN_{22}$) of the second lever (PG2).

For sake of description, the input shaft (Input), the output system (Output), the first electric machine (EM1) and the second electric machine (EM2) are collectively referred to as motive components.

The first electric machine (EM1) includes a first rotor and a first stator. Referring to FIGS. 4 to 6, the rotor of the first electric machine (EM1) directly couples to the first knot ($KN_{21}$) of the second planetary gear set (PG2). The output system (Output) couples to the second knot ($KN_{12}$) of the first planetary set (PG1) and to the second knot ($KN_{22}$) of the second planetary gear set (PG2). The input shaft (Input) couples to the third knot ($KN_{23}$) of the second planetary gear set (PG2).

The at least one clutch (CL) includes a neutral position, and a first and second engagement positions. The second electric machine (EM2) includes a second rotor and a second stator. The rotor of the second electric machine (EM2) couples selectively through the first engagement position of the clutch (CL) to the third knot ($KN_{13}$) of the first planetary gear set (PG1) as shown in FIG. 4 or through the neutral position of the clutch (CL) to none of the knots of the planetary sets as shown in FIG. 5, or through the second engagement position of the clutch (CL) to the fourth knot ($KN_{24}$) of the second planetary gear set (PG2), as shown in FIG. 6. Thus the second electric machine (EM2) selectively couples directly to the fourth knot ($KN_{24}$) of the second planetary gear set (PG2) with a first constant speed ratio, or indirectly through the first planetary gear set (PG1) to the second knot ($KN_{22}$) of the second planetary gear set (PG2) with a second constant speed ratio.

The first and second electric machines (EM1, EM2), along with their respective controllers and inverters, which are collectively referred to as power control units or drives (PCU1, PCU2), are electrically connected to transmit power to and from each other. The multi-mode electro-mechanical variable speed transmission may further include an energy storage device such as a battery pack (BT, see FIG. 19) to store and recapture energy. The energy storage device is connected to the first and second electric machines to receive power from or deliver power to one or both of the electric machines.

When the second electric machine (EM2) couples to the second knot ($KN_{22}$) of the second planetary gear set (PG2), the at least one clutch (CL) connects the second electric machine EM2 to the third knot ($KN_{13}$) of the first planetary gear set (PG1) and disconnects the second electric machine (EM2) from the fourth knot ($KN_{24}$) of the second planetary gear set (PG2) as shown in FIG. 4. The transmission is operated under the first power split mode. The input power from the engine is split into two power paths to transmit to the output system. One is the pure mechanical power path that goes from the input shaft (Input), through the second knots ($KN_{12}$, $KN_{22}$) of the first and second planetary gear sets (PG1, PG2), to the output system (Output). The other is the electro-mechanical power path that goes from input shaft (Input), through the second planetary gear set (PG2), the first electric machine (EM1), the second electric machine (EM2), the at least one clutch (CL) and the first planetary gear set (PG1), to the output system (Output).

When the second electric machine (EM2) couples to the fourth knot ($KN_{24}$) of the second planetary gear set (PG2), the at least one clutch (CL) disconnects the second electric machine (EM2) from the third knot ($KN_{13}$) of the first planetary gear set (PG1) and connects it directly to the fourth knot ($KN_{24}$) of the second planetary gear set (PG2) as shown in FIG. 6. The transmission is operated under the second power split mode. Similarly, the input power from the engine is split into two power paths to transmit to the output system (Output). The pure mechanical power path goes from the input shaft (Input) through the second planetary gear set (PG2) to the output system (Output); the electro-mechanical power path goes from the input shaft (Input), through the second planetary gear set (PG2), the first electric machine (EM1), the second electric machine (EM2), and the at least one clutch (CL) back to the second planetary gear set (PG2), and finally to the output system (Output).

A means for operation mode shifting is provided. The shifting between the first and second hybrid operation modes are carried out with the at least one clutch (CL) through a neutral position. Mode shifting criteria are developed. When shifting conditions are met, in accordance with a concrete procedure, mode shifting starts with unloading the at least one clutch (CL) by controlling torque of electric machines and torque of engine. When the torque load on the clutch reduces below a predetermined level, the at least one clutch disengages from one of its engagement positions, discon- necting the second electric machine (EM2) from the knot it currently connects, and moves to the neutral position (see FIG. 5) where the second electric machine (EM2) is free from speed constraint imposed by the first and/or the second planetary gear set, and free from any torque load exerted by the gear system. The speed of the second electric machine (EM2) can be controlled independently from the gear system. The second electronic machine (EM2) is then able to actively synchronize in rotational speed with the knot to be connected for target mode of operation. Upon synchronization, the at least one clutch (CL) engages with the other engagement position, connecting the second electric machine to the knot for the target hybrid mode of operation. Mode shifting ends with ramping back the torque load of the clutch (CL) to the normal torque value that is deemed appropriate for the clutch for the current mode of operation. To eliminate or reduce as much as possible the disturbance on output torque and drive power from the transmission, engine power is adjusted during shifting; the amount of adjustment to the engine power is determined among others by output-to-input speed ratio of the transmission.

$$P_{eng} = k\left(\frac{SR1}{SR}\right) \cdot P_{veh} \quad (2a)$$

where k is a parameter, can be obtained from vehicle calibration. $P_{eng}$ is the engine output power, and $P_{veh}$ is the vehicle motive power. SR is the output-to-input speed ratio of the transmission defined as the ratio of the output system (Output) speed to the input shaft (Input) speed and is simply referred to thereafter as the speed ratio. The speed ratio at which the speed of at least one of the electric machines is zero is defined a speed ratio node point or a speed ratio node of the transmission. SR1 is the first speed ratio node at which the speed of one of the electric machines is zero.

The engine power required to maintain undisturbed output power from the transmission can also be expressed in relation to the motive power $P_{bat}$ from or to the energy storage and the speed ratio deviation from the first speed ratio node SR1, $$\frac{P_{bat}}{P_{eng}} = k\left(\frac{SR - SR1}{SR1}\right) \quad (2b)$$

From equation (2a) and definition of speed ratio SR, it can be shown that $$T_{eng} = k \cdot SR1 \cdot T_{veh} \quad (2c)$$

where $T_{eng}$ is the engine torque and $T_{veh}$ is the output torque of the output shaft.

The first embodiment (embodiment 1) is capable of providing a natural speed ratio node SR0 and two regular speed ratio nodes SR1 and SR2. At the natural speed ratio node, the speeds of the first electric machine and the second electric machine and output system are zero. At the first regular speed ratio node SR1, the speed of the first electric machine is zero. At the second regular speed ratio node SR2, the speed of the second electric machine achieves zero rotational speed. The natural speed ratio node SR0 divides the entire speed ratio range into a forward speed ratio range and a reverse speed ratio range. Above the natural speed ratio node is the forward range; below the natural speed ratio node is the reverse range. The first regular speed ratio node SR1, also simply referred to as the first speed ratio node, further divides the forward range into a low-speed ratio range and a high-speed ratio range. Below the first speed ratio node SR1 is the low-speed ratio range and above the first speed ratio node SR1 is the high-speed ratio range.

At the first speed ratio node SR1, the torque of the second electric machine (EM2) is zero if there is no net power exchange between the transmission and the energy storage device. The first speed ratio node SR1 is often chosen as the shifting point between different power split modes to avoid or minimize possible shock load in torque for the transmission. In the low-speed ratio range below SR1, the transmission adopts the so-called output power split configuration. In the high-speed ratio range above SR1, the transmission adopts the so-call compound power split configuration. In the reverse range, the transmission operates under pure electric drive mode. Thus, the power in each power path, whether the mechanical power path or the electro-mechanical power path, is always less than the power transmitted through the transmission from the input shaft to the output system. No internal power circulation exists in any speed ratio range for the multi-mode electro-mechanical variable speed transmission. The operable speed ratio range of the transmission is thus effectively extended.

To ensure speed synchronization of the third knot ($KN_{13}$) of the first planetary gear set (PG1) with the fourth knot ($KN_{24}$) of the second planetary gear set (PG2) at the first speed ratio node SR1, thus to reduce effort of the second electric machine (EM2) in matching speed with the incoming knot to be engaged through clutch (CL) at the mode shifting point SR1, one of the following relationships between the gear ratios has to be satisfied as closely as possible, $$K_s = \frac{K_a + 1}{K_b - K_a} \quad (1a)$$

$$K_s = K_b \quad (1b)$$

Taking into consideration of possible internal power losses of the electric machines and the associated drives, and consideration of constraints imposed by gear teeth numbers, the mode shifting point $SR_b$ in speed ratio may not be exactly at but in the vicinity of SR1. To ensure rotational speed synchronization of the third knot ($KN_{13}$) of the first planetary gear set (PG1) with the fourth knot ($KN_{24}$) of the second planetary gear set (PG2), thus to reduce effort of the second electric machine (EM2) in matching speed with the incoming knot to be engaged through clutch (CL) at the shifting speed ratio $SR_b$, the gear ratios have to satisfy following relationship:

$$SR_b = \frac{K_a + 1}{K_a(K_s + 1) + 1} \quad (3)$$

Figure 7:
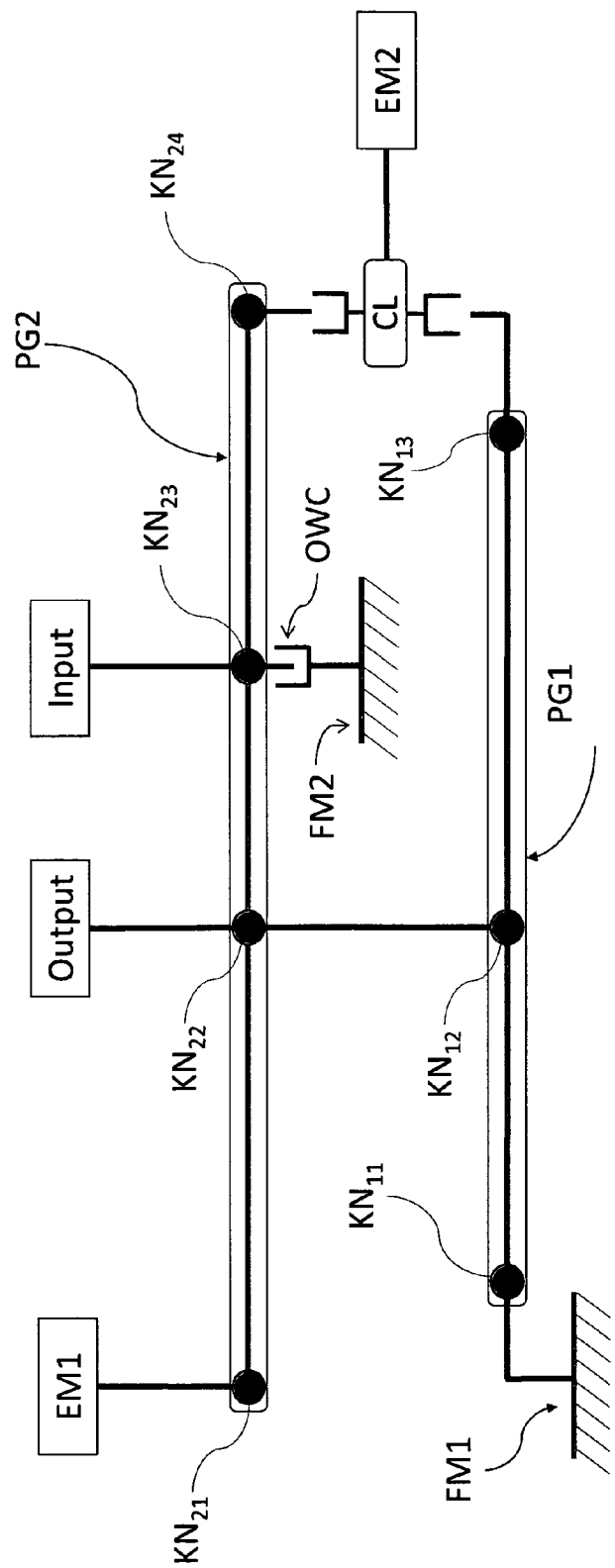
FIG. 7 is a schematic lever diagram of a variant of the preferred embodiment (embodiment 1) of multi-mode electro-mechanical variable speed transmission of the current invention with a second torque transfer device at the third knot of the second lever.

FIG. 7 shows a variant of the preferred embodiment (embodiment 1A) wherein the multi-mode electro-mechanical variable speed transmission further includes a second stationary member (FM2) and a second torque transfer device (OWC). The second torque transfer device in a simple form is a one-way clutch (OWC). The one-way clutch (OWC) selectively connects the second stationary member (FM2) to the third knot ($KN_{23}$) of the second planetary gear set (PG2). The one-way clutch prevents the input shaft (Input) from rotating in the reverse direction of the engine and provide reaction torque to balance the drive torque of the first electric machine (EM1) when it acts as motor during one of the pure electric drive modes.

Figure 8:
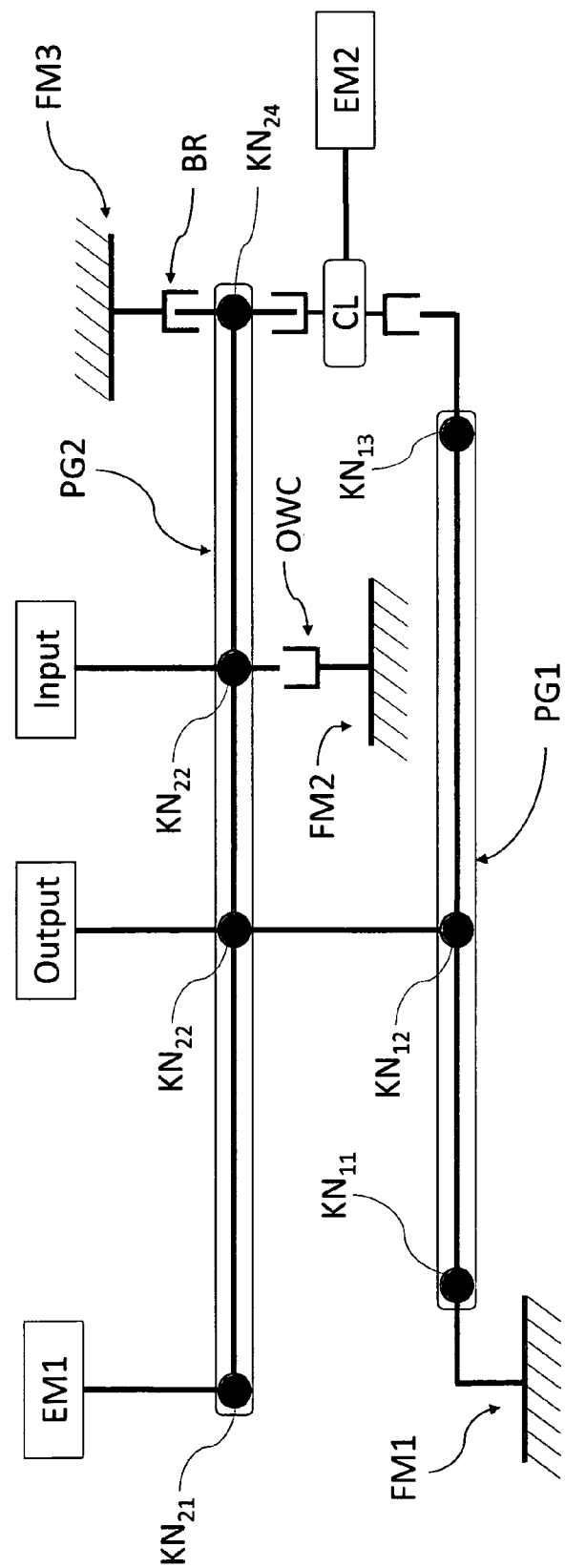
FIG. 8 is a schematic lever diagram of another variant of the preferred embodiment (embodiment 1) of multi-mode electro-mechanical variable speed transmission of the current invention with a second and third torque transfer devices.

FIG. 8 shows another variant of the preferred embodiment (embodiment 1B) wherein the multi-mode electro-mechanical variable speed transmission further includes a third stationary member (FM3) and a third torque transfer device (BR). The third torque transfer device is a brake (BR). The brake selectively connects the fourth knot ($KN_{24}$) of the second planetary gear set (PG2) to or disconnects it from the third stationary member (FM3).

Figure 9:
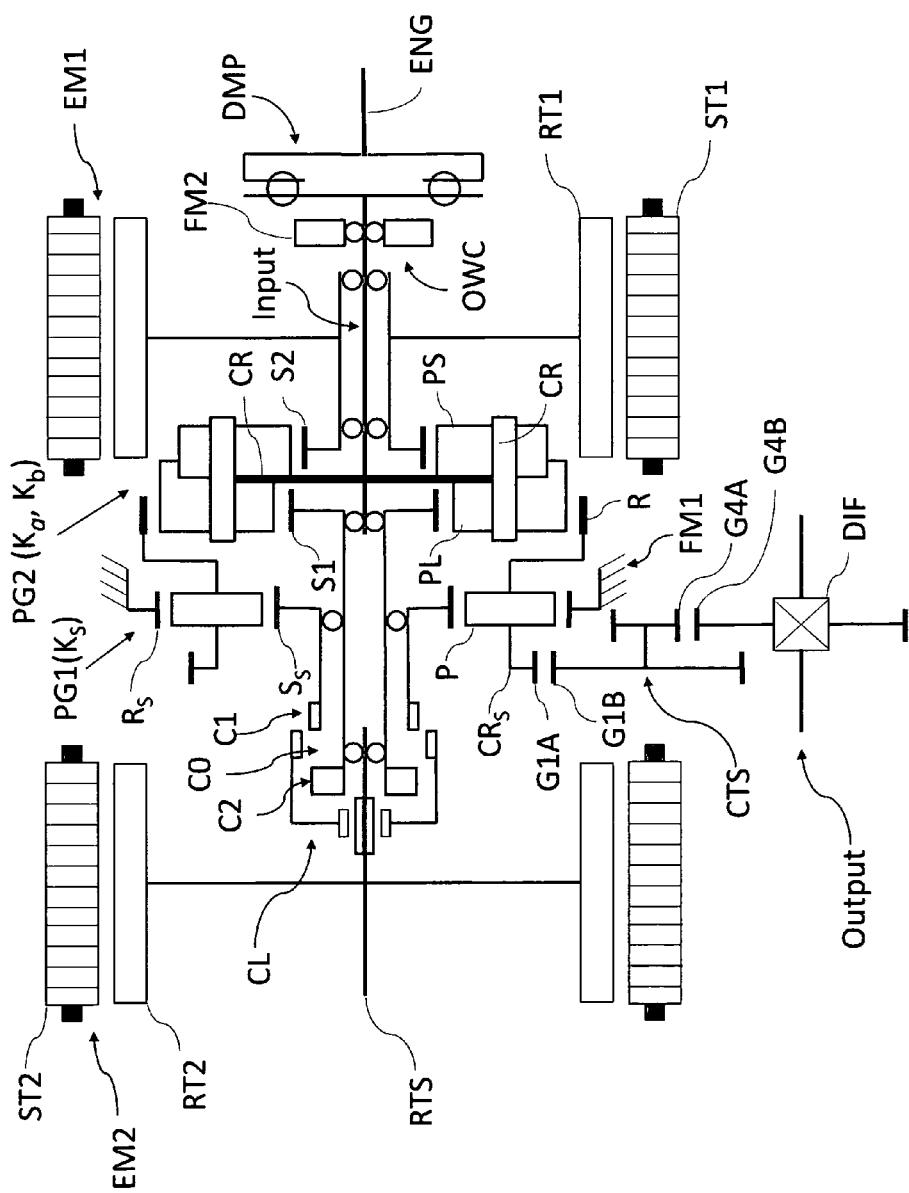
FIG. 9 is a component schematic diagram of the referred embodiment (embodiment 1) of multi-mode electro-mechanical variable speed transmission of the current invention.

FIG. 9 shows the same variant as illustrated in FIG. 7 in form of component schematic diagram wherein the knots of the lever diagrams are represented by actual components of the corresponding planetary gear sets. The multi-mode electro-mechanical variable speed transmission is comprised of a first planetary gear set (PG1) including three co-axial rotatable components, a second planetary gear set (PG2) including four-coaxial rotatable components, an input shaft (Input), an output system (Output), a first torque transfer device or a clutch (CL), a second torque transfer device (OWC), a first stationary member (FM1), a first electric machine (EM1) and a second electric machine (EM2). The transmission may also include a torsional damper (DMP) to connect the input shaft (Input) to the engine output shaft (ENG) and a counter shaft system (CTS) to connect the first and second planetary gear sets to the output system (Output).

The first planetary gear set (PG1) includes a sun gear ($S_s$), a ring gear ($R_s$), a set of planet gears (P) supported on a planet carrier ($CR_s$). The planet gears (P) are arranged around and in external mesh with the sun gear ($S_s$). The planet gears (P) are in internal mesh with the ring gear ($R_s$). The sun gear ($S_s$), the planet carrier ($CR_s$) and the ring gear ($R_s$) form the three co-axial rotatable components of the first planetary gear set (PG1). These three co-axial rotatable components are represented respectively as the first knot ($KN_{11}$), the second knot ($KN_{12}$) and the third knot ($KN_{13}$) on a three-knot lever diagram. The first planetary gear set (PG1) is characterized by the gear teeth ratio $K_s$ of ring gear ($R_s$) to the sun gear ($S_s$) which is expressed as the inter-distance between the second and third knots on the three-knot lever diagram, with the inter-distance between the first and second knots being one unit in length.

$$K_s = \frac{Z_{R_s}}{Z_{S_s}} \quad (4)$$

where $Z_{S_s}$ and $Z_{R_s}$ are the number of teeth for sun gear ($S_s$) and ring gear ($R_s$) of the first planetary gear set (PG1), respectively.

The second planetary gear set (PG2) is a Ravigneaux planetary gear-train. It includes a first sun gear (S1), a second sun gear (S2), a ring gear (R), a first set of planet gears (PS), a second set of planet gears (PL), and a planet carrier (CR) that hosts and supports the first and second sets of planet gears (PS, PL). The planet gears in the first set are short planet gears and the planet gears in the second set are long planet gears. Each of the long planet gears (PL) is in internal meshing engagement with the ring gear (R) and in external meshing engagement with the first sun gear (S1); each of the short planet gears (PS) is in external meshing engagement with a corresponding long planet gear (PL) and with the second sun gear (S2). The second sun gear (S2), the ring gear (R), the planet carrier (CR) and the first sun gear (S1) are the four co-axial rotatable components of the second planetary gear set (PG2) and as represented as the first knot (KN$_{21}$), the second knot (KN$_{22}$), the third knot (KN$_{23}$) and the fourth knot (KN$_{24}$) on a four-knot lever diagram. The second planetary gear set is characterized by two gear teeth ratios K$_a$ and K$_b$.

$$K_a = \frac{Z_{S1}}{Z_R}; K_b = \frac{Z_{S1}}{Z_{S2}} \qquad (5)$$

where Z$_{S1}$, Z$_{S2}$ and Z$_R$ are the tooth numbers of the first sun gear (S1), the second sun gear (S2) and the gear (R) of the second planetary gear set (PG2), respectively. On the four-knot lever diagram, K$_a$ and K$_b$ are denoted as the inter-distance between the second and third knots and the inter-distance between the first and third knots, respectively.

The first planetary gear set and the second planetary gear set are co-axially arranged and adjacent to each other in the axial direction. The ring gear (R$_s$) of the first planetary gear set (PG1) is connected to the first stationary member (FM1). In this regard, the first planetary gear functions merely as a stepping up gear with a constant gear ratio. The planet carrier (CR$_s$) of the first planetary gear set is fixed with the ring gear (R) of the second planetary gear set (PG2) such that they have a same rotational speed.

The output system includes at least one drive shaft and an optional differential (DIF). The first torque transfer device (CL) has one neutral position and at least two engagement positions. It could be considered as an integrated unit of a first and a second clutches (C1, C2) each having an engagement and a disengagement positions. The two clutches (C1, C2) could also be separate clutch units and operate independently. The first electric machine (EM1) includes a first rotor (RT1) and a first stator (ST1). The second electric machine (EM2) includes a second rotor (RT2) and a second stator (ST2). The second torque transfer device includes a second stationary member (FM2) and a one-way clutch (OWC). The counter shaft system (CTS) includes a first pair of meshing gears (G1A, G1B) and a second pair of meshing gears (G4A, G4B).

The multi-mode electro-mechanical variable speed transmission is configured to provide multiple modes of operations through the unique connections between the gear system (PG1, PG2) and the motive components (Input, Output, EM1 and EM2). Referring to FIG. 9, the rotor (RT1) of the first electric machine (EM1) is connected to the second sun gear (S2) of the second planetary gear set (PG2). The output system (Output) is connected through the two pairs of meshing gears (G4B and G4A, and G1B and G1A) of the counter shaft system (CTS) to the planet carrier (CR$_s$) of the first planetary gear set (PG1) and the ring gear (R) of the second planetary gear set (PG2) wherein the differential (DIF) connects to the driven gear (G4B) of the second pair of meshing gears of the counter shaft system (CTS) and drive gear (G1A) of the first pair of meshing gears of the counter shaft system (CTS) connects to the planet carrier (CR$_s$) of the first planetary gear set (PG1) and the ring gear (R) of the second planetary gear set (PG2). The engine (ENG) drives the input shaft (Input) through the torsional damper (DMP). The input shaft (Input) in turn connects to the planet carrier (CR) of the second planetary gear set (PG2). The input shaft (Input) also couples to the second torque transfer device wherein the one-way clutch (OWC) directionally engages the second stationary member (FM2) to prevent the input shaft from rotating in the opposite direction to the engine. The rotor (RT2) of the second electric machine (EM2) is selectively coupled through the first torque transfer device (CL) either to the sun gear (S$_s$) of the first planetary gear set (PG1) wherein the first clutch (C1) engages and the second clutch (C2) disengages, or to the first sun gear (S1) of the second planetary gear set (PG2) wherein the first clutch (C1) disengages and the second clutch (C2) engages. Thus the second electric machine (EM2) couples selectively to the first sun gear (S1) of the second planetary gear set (PG2) with a first constant speed ratio (a speed ratio of 1:1) or through the first planetary gear set (PG1) to the ring gear (R) of the second planetary gear set (PG2) with a second speed ratio (a speed ratio of (K$_s$+1):1). The first clutch (C1) and the second clutch (C2) can both disengage, leaving the rotor (RT2) of the second electric machine (EM2) in a free state where the speed of the rotor (RT2) can be independently controlled. When both of the first and second clutches (C1 and C2) are disengaged, the first torque transfer device (CL) is in the neutral position.

The first and second torque transfer devices (CL, OWC) are arranged on the same axial line of rotation as the first and second planetary gear sets. That is to say, the first planetary gear set (PG1), the second planetary gear set (PG2), the first torque transfer device (CL) and the second torque transfer device (OWC) all share the same axial line of rotation. In addition, the first and second planetary gear sets (PG1, PG2) are co-axially arranged with and sandwiched between the two electric machines (EM1,EM2). This has a great advantage in reducing package size.

The first torque transfer device (CL) may be further integrated with the brake (BR) and the third stationary member (FM3). It may be modified to include a third engagement position and to have total of four working positions as shown in FIGS. 10 to 13. The integrated torque transfer device (CL) is comprised of a first clutch having a first clutch member (C1) at the first engagement position, a second clutch having a second clutch member (C2) at the second engagement position, a third clutch having a third clutch member (BR) at the third engagement position, and a sleeve ring (SL). The first clutch member (C1) is fixed with the sun gear (S$_s$) of the first planetary gear set (PG1), the second clutch member (C2) the fixed with the first sun gear (S1) of the second planetary gear set (PG2), and the third clutch member (BR) is fixed with the third stationary member (FM3). The sleeve ring (SL) is connected to a rotor shaft (RTS) of the second electric machine (EM2) through a pair of mating splines (SP$_i$, SP$_o$). The male spline (SP$_o$) of the mating pair is fixed to the rotor shaft (RTS) and the female spline (SP$_i$) is fixed to the sleeve ring (SL). The female spline (SP$_i$) slides back-and-forth over the male spline (SP$_o$) along the axial direction by an actuator controlled by a controller (CT) shown in FIG. 19.

Figure 10:
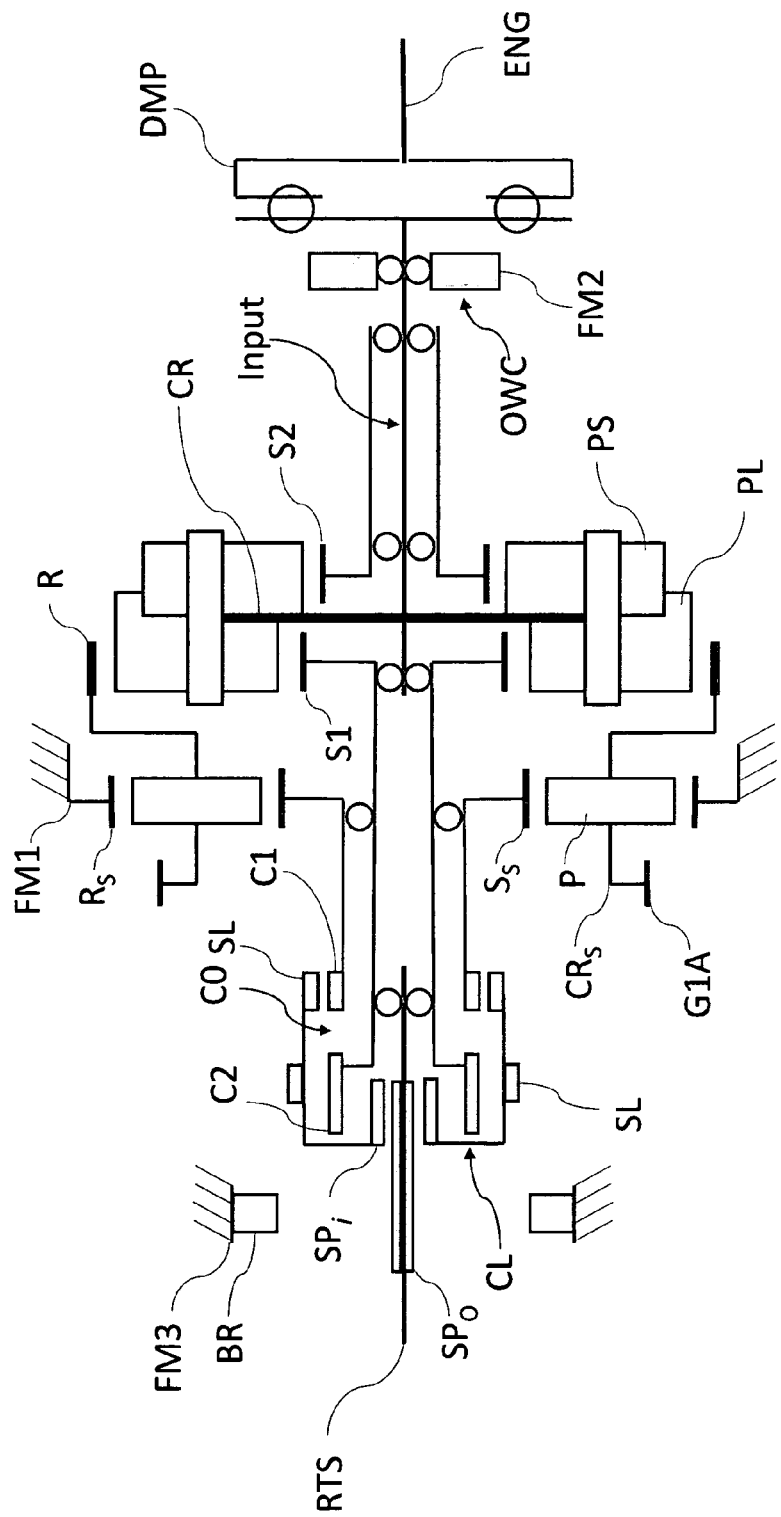
FIG. 10 is a component schematic diagram of a torque transfer device, showing the first engagement position.

FIG. 10 shows the first work position, namely the first engagement position, of the first torque transfer device (CL), wherein the sleeve ring (SL) is engaged only with the first clutch member (C1). In this case, the rotor shaft (RTS) and thus the rotor (RT2) of the second electric machine (EM2) is coupled to the sun gear (S$_s$) of the first planetary gear set (PG1). The transmission operates in a first power-split mode.

Figure 11:
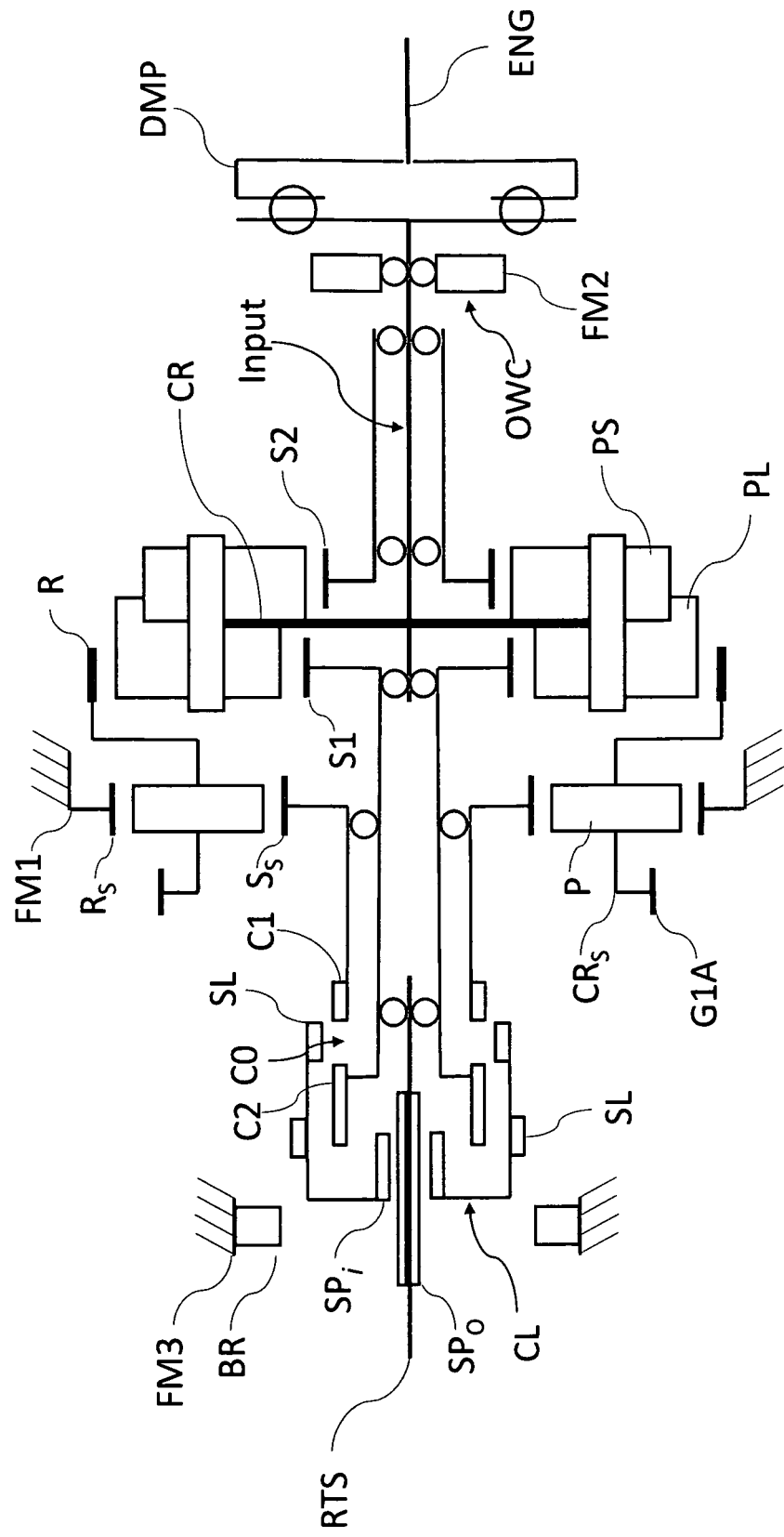
FIG. 11 is a component schematic diagram of a torque transfer device, showing neutral position.

FIG. 11 shows the second working position; that is the neutral position of the first torque transfer device (CL), wherein the sleeve ring (SL) is moved to a neutral position (C0) disengaging both from the first and second clutch members (C1, C2). In this position, the rotor shaft (RTS) and thus the rotor (RT2) of the second electric machine (EM2) is not coupled to any gear members of the first planetary gear set (PG1) and the second planetary gear set (PG2), and thus the speed of the rotor (RT2) is not constrained by the speed of input shaft (Input), the output system (Output) or the first electric machine (EM1). The second electric machine (EM2) is in a free state, and can be operated independently at any desired speed to actively synchronize with the speed of clutch member (C1) or the speed of clutch member (C2).

Figure 12:
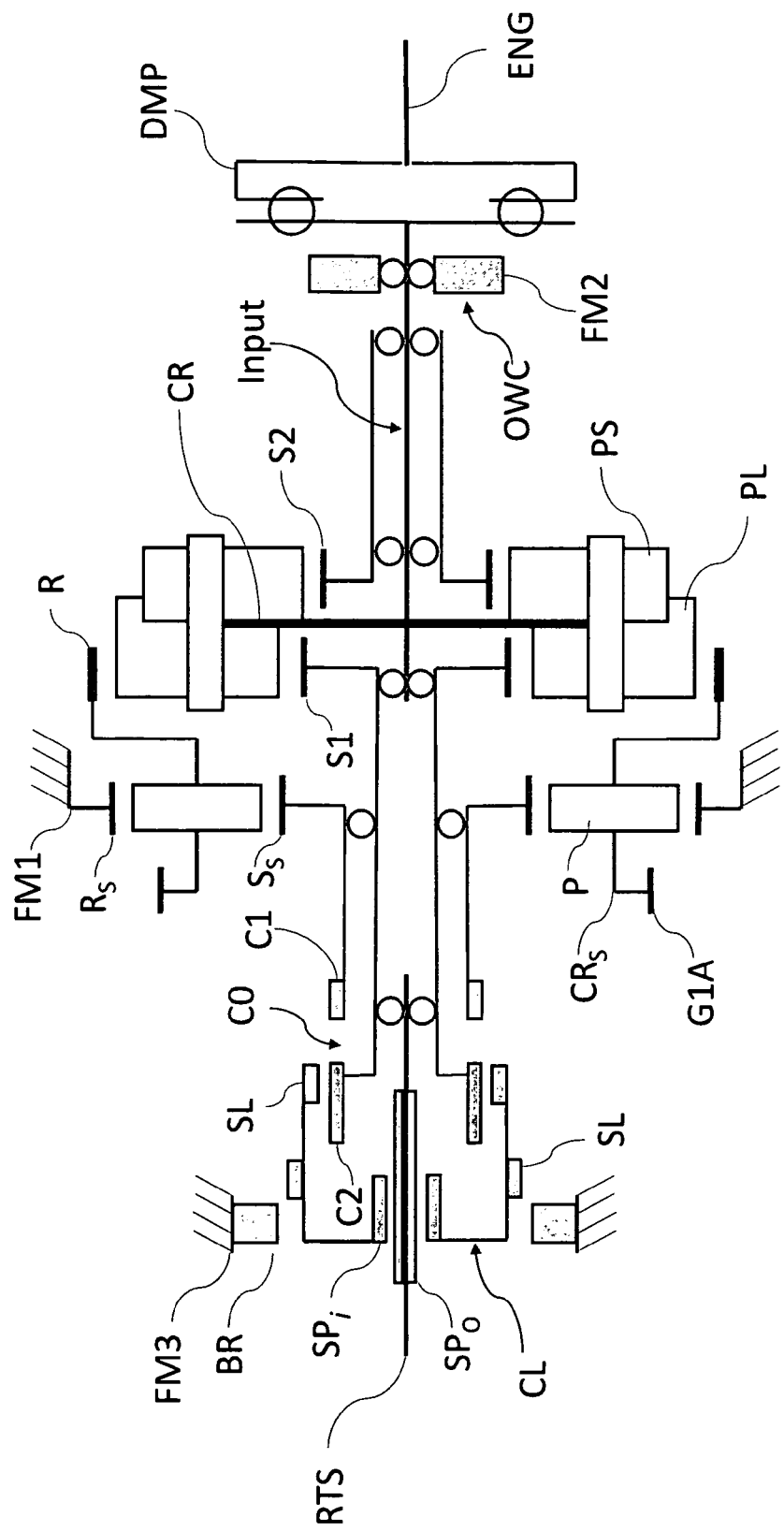
FIG. 12 is a component schematic diagram of a torque transfer device, showing the second engagement position.

FIG. 12 shows the third working position that is the second engagement position of the first torque transfer device (CL), wherein the sleeve ring (SL) is engaged only with the second clutch members (C2). In this position, the rotor shaft (RTS) and thus the rotor (RT2) of the second electric machine (EM2) is coupled to the first sun gear (S1) of the second planetary gear set (PG2). The transmission operates in a second power-split mode.

Figure 13:
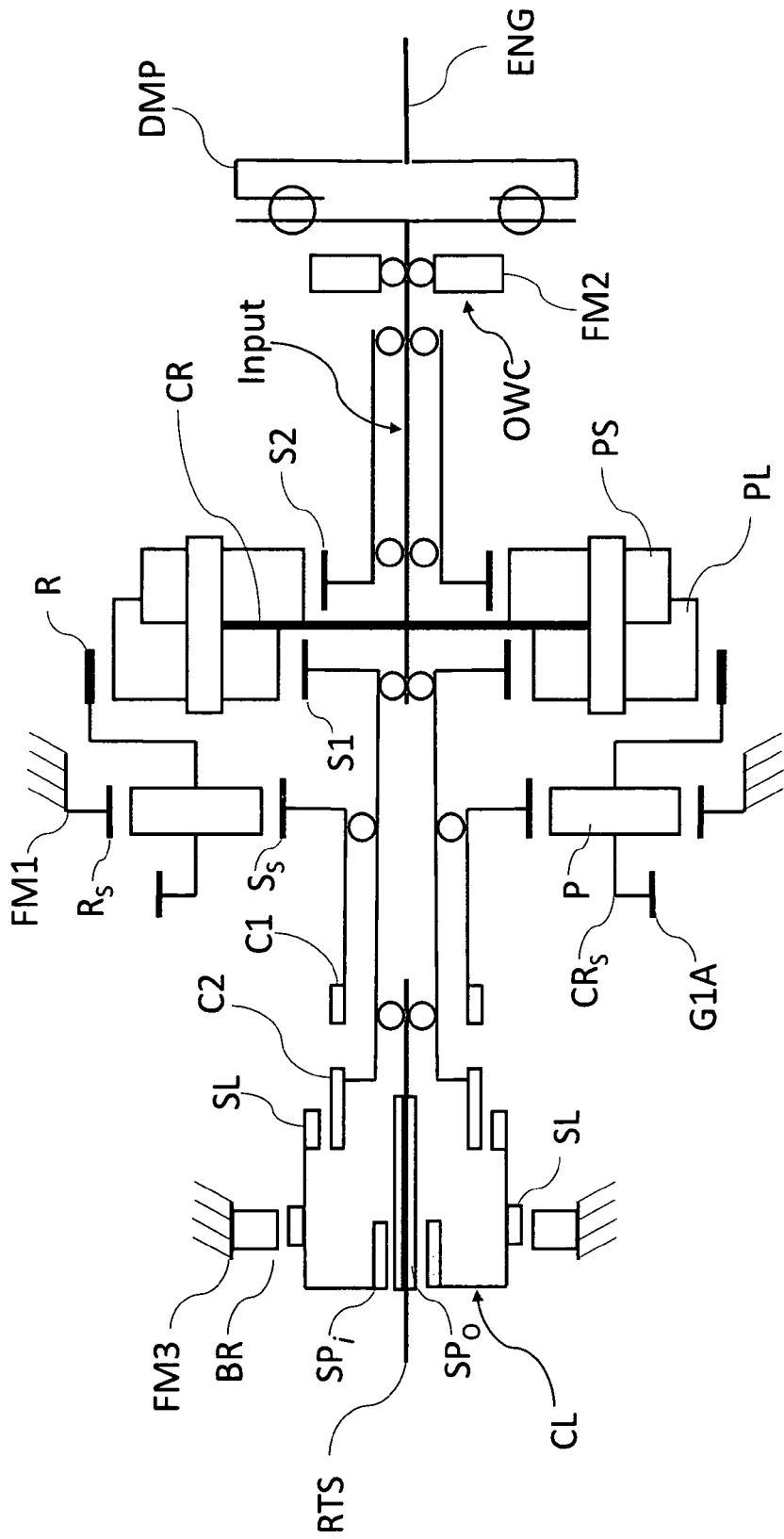
FIG. 13 is a component schematic diagram of a torque transfer device, showing the third engagement position.

FIG. 13 shows the fourth working position that is the third engagement position of the first torque transfer device (CL), wherein the sleeve ring (SL) engages with both the second and third clutch members (C2, BR). In this position, the rotor shaft (RTS) and thus the rotor (RT2) of the second electric machine (EM2) is coupled to both the first sun gear ($S_s$) of the second planetary gear set (PG2) and the third stationary member (FM3). The transmission operates in a fixed speed ratio mode.

The four working positions of the first torque transfer device (CL) are arranged adjacent to each other along the axial direction. When positive engagement clutches such as dog-clutches are used, this leads to very compact configuration. The existence of neutral position (C0) between the first and second engagement positions (C1) and (C2) allows the second electric machine (EM2) to rotate independently and to actively synchronize the rotation speed of its rotor (RT2) with one of the engagement positions (C1, C2 or BR) before engagement is commenced.

The operation of the multi-mode electro-mechanic variable speed transmission is described below.

Continuously Variable Speed Operation

1. Low Speed Ratio Range

As those skilled in the art will appreciate, the operation of a hybrid vehicle is controlled by a centralized controller (CT) or distributed controllers (such as HCU, ECU, BMS, ABS and others for example) that are networked together through a CAN bus and/or FlexRay. A hybrid control unit (HCU) in concert with an engine control unit (ECU) and a battery management system (BMS) controls the operation of the multi-mode electro-mechanic variable speed transmission (see FIG. 19).

Before the vehicle starting to move, transmission is disposed to operate in low speed ratio range. The second electric machine (EM2) couples via the at least one torque transfer device (CL) to the ring gear (R) of the second planetary gear set (PG2) through the first planetary gear set (PG1) to gain a leverage to propel the output system (Output). The first electric machine (EM1) is idling, and rotating in the opposite direction to that of the internal combustion engine (Input). The second electric machine (EM2) for a brief initial moment is at zero speed. As the vehicle starts, the controller (CT or HCU) sends commends to drive circuit (PCU2). The drive circuit (PCU2), in turn, provides the required electric power or current to the second electric machine (EM2) to generate drive torque. The drive torque is amplified through the first planetary gear set (PG1) and delivered to the output system (Output). At this moment, except for an insignificant amount of internal power losses, the second electric machine EM2 does not convert yet any electric power into mechanical power. Because the vehicle is still at standstill, there is no requirement for drive power but drive torque at the drive wheels. The drive torque to start the vehicle comes primarily from the second electric machine (EM2). Concurrently, the internal combustion engine provides zero starting torque for the vehicle, thus there is essentially no motive power output form the engine. As the torque of electric machine increases, the vehicle takes off from standstill and moves forward. Accordingly, the second electric machine (EM2) starts to rotate, consuming electric power and converting it into the required mechanical drive power. Meanwhile, the engine starts to provide drive torque to the drive wheels as well. The first electric machine (EM1) in turn provides reaction torque to balance the engine torque and the speed of the first electric machine (EM1) gradually reduces to accommodate the increased vehicle speed. In this process, the first electric machine (EM1) acts as a generator converting mechanical power into electric power. The electric power consumed by the second electric machine (EM2) is fully or partially provided by the first electric machine (EM1) through electric drives and controllers (CT). After the vehicle has started to move, the drive torque at the drive wheels is shared between the internal combustion engine and the second electric machine (EM2), causing the torque of the second electric machine (EM2) to reduce.

As the speed of vehicle increases, the rotational speed of the second electric machine (EM2) increases and the torque of the second electric machine (EM2) continues to decrease. In contrast, the speed of the first electric machine (EM1) continues to decrease, until reaching zero. At the moment when the speed of the first electric machine (EM1) reaches zero speed, the transmission arrives at its first regular speed ratio node SR1. Assuming there is no net electric power exchange between the transmission and the energy storage device, the second electric machine (EM2) also arrives at its zero torque point. That is to say the zero torque point of the second electric machine (EM2) coincides with the zero speed point of the first electric machine (EM1).

2. High Speed Ratio Range

The first speed ratio node SR1 marks the transition from low-speed ratio range to high-speed ratio range and vice versa. In the low-speed ratio range, the transmission is operated in output power split mode, and in the high-speed ratio range, the transmission is operated in compound power split mode. At the first speed ratio point SR1, the second electric machine (EM2) produces zero torque, if there is no net power from battery, and the speeds of the second electric machine (EM2), the third knot ($KN_{13}$) of the first planetary gear set (PG1) and fourth knot ($KN_{24}$) of the second planetary gear set (PG2) are self-synchronized. This makes the first speed ratio node point SR1 an ideal target point for shifting between different modes of operations. For this reason, the first speed ratio node SR1 is selected as the nominal operation mode shifting point. To reduce hunting about the nominal mode shifting point, a buff zone SR1±ΔSR, is introduced. The actual shifting point for upshifting is set to be higher than SR1 by amount of ΔSR; that is to say at a speed ratio of SR=SR1+ΔSR. The actual shifting point for downshift is set to be lower than SR1 by ΔSR; that is to say at a speed ratio of SR=SR1−ΔSR.

Figure 14:
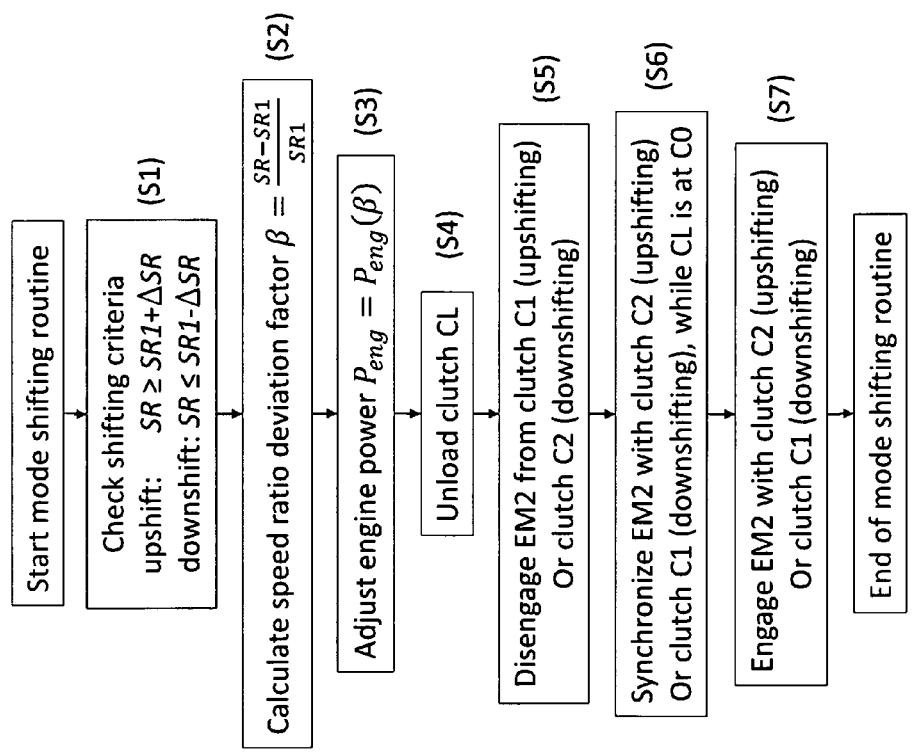
FIG. 14 is a flowchart showing the procedure of mode shifting between two different operating modes of multi-mode electro-mechanical variable speed transmission of the current invention.

FIG. 14 shows the procedure for mode shifting between the output power split mode operation and the compound power split mode operation. It constitutes means for mode shifting. The procedure includes steps from S1 to S7. Some of these steps can be combined, or executed in parallel. Alternatively, the order of these steps can be changed to suit for a specific implementation. The procedure is executed by a centralized controller or by a group of distributed controllers which constitutes the means for unloading torque transfer device, the means for setting and adjusting engine power, the means for setting and adjusting engine speed and torque, the means for shifting one of the electric machines to freewheeling state, the means for setting and controlling the speed of one of the electric machines and the means for synchronizing the speed of one of the electric machines with speed at one of the engagement positions of the torque transfer device.

Referring to FIG. 14, the procedure for mode shifting between two power split modes includes steps of:

(S1) Check shifting criteria. If the speed ratio meets condition SR≥SR1+ΔSR, issue an upshifting signal; if the speed ratio SR≤SR1−ΔSR, issue a downshifting signal. Here ΔSR can be a predetermined constant or a variable whose value changes in accordance with operation conditions and ΔSR may assume different values for upshifting and downshifting;

(S2) Calculate a normalized speed ratio with respect to the first speed ratio node SR1. The normalized speed ratio is evaluated on a relative scale and is expressed as $$\alpha = \frac{SR}{SR1} \quad (6)$$

(S3) Set and adjust engine power $P_{eng}$ with respect to the power from the energy storage device in accordance with the normalized speed ratio and drive power $P_{veh}$ required from the vehicle, $$P_{eng} = \frac{k}{\alpha} \cdot P_{veh};$$

In the equation, the parameter k can be obtained from calibration testing. Alternatively, engine torque $T_{eng}$ can be set and adjusted in accordance with SR1 and drive torque $T_{veh}$, as $T_{eng} = k \cdot SR1 \cdot T_{veh}$ (S4) Unload the torque transfer device (CL) by adjusting torque of the electric machines, and prepare for disengagement. This can be done in concert with engine power or/and torque adjustment.

(S5) Disengage the second electric machine (EM2) from engagement position C1 for upshifting, or from engagement position C2 for downshifting. Set the second electric machine (EM2) to the freewheeling state by moving the torque transfer device to the neutral position C0.

(S6) Set a target speed for the second electric machine (EM2). The target speed can be a constant or a variable. It is the speed of the component at the engagement position C2 for upshifting or the speed of the component at the engagement position C1 for downshifting. Synchronize the rotor speed of the second electric machine (EM2) with the target speed.

(S7) Engage the second electric machine (EM2) with the component at engagement position C2 for upshifting, or with the component at engagement position C1 for downshifting. Once the engagement is accomplished, the load on the torque transfer device will be ramped back to its normal value.

To operate under high speed ratio range, the transmission needs to be upshifted into the compound power split mode. When upshifting condition SR≥SR1+ΔSR is met, an upshift signal is sent out, hybrid control unit (HCU) sets torque commands to the electric machines to unload the at least one clutch (CL), and at the same time, sets and adjusts the engine power according to the calculated speed ratio deviation factor or engine torque in accordance with speed ratio node SR1 and drive torque such that drive torque and output power from transmission remains undisturbed. Unloading the at least one clutch may be carried out through a ramping process. The at least one clutch (CL) then disconnects the second electric machine (EM2) from the third knot ($KN_{13}$) of the first planetary set (PG1) and moves to the neutral position (C0) thus shifting the second electric machine to a freewheeling state. In this freewheel state, the speed of the second electric machine can be independently controlled irrespective of the speed ratio of the transmission. The hybrid controller (HCU) sets and controls the speed of the second electric machine (EM2) in the freewheeling state, and synchronize the rotor (RT2) speed of the second electric machine (EM2) with the speed of the fourth knot ($KN_{24}$) of the second planetary gear set (PG2) to which C2 is connected. Once the synchronization is confirmed, the at least one clutch (CL) connects the second electric machine (EM2) to the fourth knot ($KN_{24}$) of the second planetary gear set (PG2). Transmission is now operating under compound power split mode. The compound power-split mode is maintained as long as the speed ratio of the transmission is above the downshifting point SR1−ΔSR.

The above described means and procedure for mode shifting provide a smooth, continuous and non-power interruptive shifting irrespective of types of clutches. This allows positive engagement type of clutches such as a dog clutch to be used to achieve equivalent or even superior shifting quality as friction type of clutches. Positive engagement type of clutches are usually simple, compact and more efficient and have higher torque capacity.

As the speed of the vehicle further increases, the speed ratio of the transmission continues to increase, exceeding the upshifting speed ratio SR1+ΔSR. The rotational speed of the first electric machine (EM1), rises from zero and continues to increase in the same direction as the input shaft (Input). The speed of the second electric machine (EM2) starts to reduce. Should there be no net electric power exchange between the transmission and energy storage device (BT), the torque of the second electric machine (EM2) will rise from zero and increase in value in the opposite direction. The second electric machine (EM2) now functions as a generator, providing electric power to the first electric machine (EM1) or/and to the energy storage device. The first electric machine (EM1), acts as a motor, converting electric power into mechanical power.

As the vehicle continues to increase in speed, the speed of the second electric machine (EM2) continues to decrease towards zero. When the speed of the second electric machine decreases to zero, the transmission reaches its second speed ratio node SR2. At this speed ratio node, the power transmitted through the electro-mechanical power path becomes zero; all power is transmitted from input shaft (Input) to the output system (Output) through the pure mechanical power path.

Between the first speed ratio node SR1 and the second speed ratio node SR2, the power split ratio PR, defined as the power transmitted through the electro-mechanical power path to the total engine power to be transmitted at the input shaft (Input), possesses a local maximum value. The maximum value is dependent upon the characteristic gear ratios of the four-branch planetary gear set (the second planetary gear set). Assuming the maximum input power of the transmission is $P_{in}$ and the maximum continuous power rating of the electric machine is $P_{em}$, the power ratio of the maximum continuous power rating of the electric machine to the maximum input power of the transmission is denoted as $PR_{max}=P_{em}/P_{in}$. For an adequate matching between the sizes of electric machines and the construction of the transmission, so that the transmission can be operated continuously and appropriately between the first and second regular speed ratio nodes, the characteristic parameters of the four-branch gear system must satisfy following condition, $$\frac{K_b(K_a+1)}{K_b-K_a} \leq \left(\frac{1+PR_{max}}{1-PR_{max}}\right)^2 \qquad (7)$$

At or in the vicinity of the second speed ratio node SR2, the torque of the first electric machine (EM1) reverses its direction. As the speed ratio of the transmission continues to increase, the speed of the first electric machine (EM1) continues to go up; concurrently, the speed of the second electric machine (EM2) rises from zero and increases in the reversed direction. To avoid excessive internal power circulation when the speed ratio of the transmission exceeds far beyond the second speed ratio node SR2, a brake (BR) may be employed in the transmission to brake the fourth knot ($KN_{24}$) of the second planetary gear set (PG2) when it is deemed necessary.

3. Reverse Range.

The speed ratio range below the natural speed ratio node SR0 is referred to as the reverse range. In this range, the output power split configuration is also applicable. The at least one clutch (CL) connects the second electric machine (EM2) to the third ($KN_{13}$) of the first planetary gear set (PG1) and disconnects it from the forth knot ($KN_{24}$) of the second planetary gear set (PG2). In this regards, the second electric machine (EM2) is coupled to the second knot ($KN_{22}$) of the second planetary gear set (PG2) through the first planetary gear set (PG1) to gain a torque leverage. The power is delivered from the second knots ($KN_{12}$, $KN_{22}$) of the first and second planetary gear sets to the output system (Output).

Pure Electric Drive Operation

To restrict the power ratio of the electric power path to the input power, avoiding internal power circulation, a pure electric drive mode may be adopted in the reverse range. In the pure electric drive mode, the engine is turned off. The second electric machine (EM2) is controlled by the controller (CTRL) to convert electric power from the energy storage (battery BT) into mechanical power and to provide drive torque to the output system (Output). The drive torque from the second electric machine (EM2) is amplified through the first planetary gear set (PG1) before delivered to the output system (Output).

Pure electric drive operation is also applicable in forward speed ratio range. In fact, there are a number of electric modes. The first electric drive mode is essentially the same as the pure electric drive mode described above for reverse operation. In this electric drive mode, the first torque transfer device (CL) connects the second electric machine (EM2) to the first planetary gear set (PG1) and disconnects the second electric machine (EM2) from the second planetary gear set (PG2). The second electric machine (EM2) is coupled to the second planetary gear set (PG2) through the first planetary gear set (PG1). The motive power is provided by the second electric machine (EM2) through the first planetary gear set (PG1). The first planetary gear set (PG1) provides torque leverage by a factor $K_s+1$.

The second electric drive mode involves two electric machines working in tandem to provide enhanced motive power for fast acceleration or for steep hill-climbing. Similar to the first electric drive mode, the first torque transfer device (CL) connects the second electric machine (EM2) to the first planetary gear set (PG1) and disconnect the second electric machine (EM2) from the second planetary gear set (PG2). Part of the motive power is provided by the first electric machine (EM1) through the second planetary gear set (PG2). Referring to FIGS. 7 to 9, the one-way clutch (OWC) prevents the input shaft (Input) from rotating in the opposite direction of the engine. In doing so, it provides a reaction torque to balance the drive torque of the first electric machine (EM1). The second planetary gear set (PG2) provides a torque leverage by a factor of $K_b/K_a$ to the first electric machine (EM1). The other part of the motive power is provided by the second electric machine (EM2) through the first planetary gear set (PG1). The first planetary gear set (PG1) provides a torque leverage by a factor $K_s+1$ to the second electric machine (EM2).

Geared Neutral and Parking

The multi-mode electro-mechanical variable speed transmission is capable of providing additional useful functions including geared neutral and parking. When the at least one clutch (CL) is disengaged from both the first and second planetary gear sets, and moved to the neutral position, and the first electric machine (EM1) is switched off or at a freewheeling state, the transmission is at geared neutral. When both the first and second electric machines (EM1, EM2) are switched off or at freewheeling states, the transmission is also at geared neutral.

Parking is provided by conventional parking pawl (PBR) installed on the transmission.

Fixed Speed Ratio Operation

The multi-mode electro-mechanical variable speed transmission of the current invention is capable of offering at least one fixed output-to-input speed ratio operation. The fixed speed ratio operation is provided to suit special application requirements such as towing and cruising on a highway. The conditions for the fixed speed ratio operation are listed in the following table.

| Fixed speed-ratio | SL engagement status of CL | | |
|---|---|---|---|
| mode | C1 | C2 | BR |
| 1 | disengage | engage | engage |

The fixed speed ratio is essentially at the second speed ratio node SR2 of the transmission. Shifting between the fixed speed-ratio operation mode and compound power split operation mode can also be achieved in a smooth and continuous manner. There are unique aspects about shifting from compound power-split operation to fixed speed ratio operation. First, the shifting criteria may now be based on operation efficiency, electric machine condition or on operator's desire. Second, the target speed ratio for shifting is fixed to SR2. Finally, there is not freewheeling state for the second electric machine in the event of shifting. With consideration of those unique aspects, following shifting procedure is adapted.

(S101) Calculate speed ratio deviation factor with respect to the first speed ratio node SR1;

(S102) Unload the at least one torque transfer device (CL);

(S103) Set and adjust engine power in accordance with the calculated speed ratio deviation, or normalized speed ratio;

(S104) Set and control the speed of the fourth knot ($KN_{24}$) of the second planetary gear set (PG2) and the second electric machine (EM2), and synchronize it with the stationary member (FM3) of the transmission;

(S105) Engage brake, connecting the fourth knot ($KN_{24}$) of the second planetary gear set (PG2) to the stationary member (FM3) of the transmission. Once the engagement is confirmed, ramp back the torque load on the torque transfer device to its normal value.

There is no power interruption during operation mode change from compound power-split operation to the fixed speed ratio operation. In addition, in the fixed speed ratio operation, at least one of the electric machines (EM1, EM2) can act as motors or generators to provide power assisting or regenerative braking functions as in parallel electric hybrid systems. This results in enhanced performance of the vehicle system.

As understood by those skilled in the art, the torque transfer device mentioned above can be any type of mechanical, hydro-mechanical, or electro-magnetic clutches, brakes or combination of clutches and brakes. Since the engagement or disengagement of the torque transfer devices takes place under synchronization conditions wherein all of the involved components need to be connected or disconnected are essentially at the same rotational speed, simple clutches such as positive engagement clutches or dog clutches can be used instead of the more complex and costly friction clutches. This eliminates the hydraulic system otherwise required by wet friction clutches, and thus effectively reduces internal power losses.

Other Operation Status

Embodiment 1 and its variants (Embodiment 1A, Embodiment 1B) also provide the function for starting up the engine. Engine start up is accomplished either by one of the two electric machines independently or by both electric machines working collaboratively. Fox example, when the transmission is at geared neutral, the engine can be started by two electric machines in collaboration. When the transmission is under pure electric drive mode, the engine can be started by the first electric machine (EM1).

When energy storage device (BT) is used in conjunction with the multi-mode electro-mechanical variable speed transmission, the transmission is capable of providing not only continuous speed ratio variation, but also energy buffering, offering the so-called hybrid drive operation. Under hybrid drive operation, power between the two electric machines no longer needs to be balanced. The electric power generated by one electric machine may be more or less than the electric power consumed by the other electric machine. Under such circumstances, the speed ratio node at which one of the electric machines has zero rational speed may not coincide with the speed ratio at which the other electric machine has zero torque. The position of speed ratio at which one of the electric machines has zero torque varies with the power imbalance between the two electric machines. However, the position of speed ratio node at which one of the electric machines has zero speed always remains the same irrespective of the power imbalance between the two electric machines.

When there is net electric power exchange between the electric power path of the transmission and the energy storage device, the electric machines have to fulfill double duties of both speed ratio regulation and power regulation. Thus, the power ratings of the electric machine should not be less than the maximum electric power split ratio times the rated power at the input shaft of the transmission.

Figure 15:
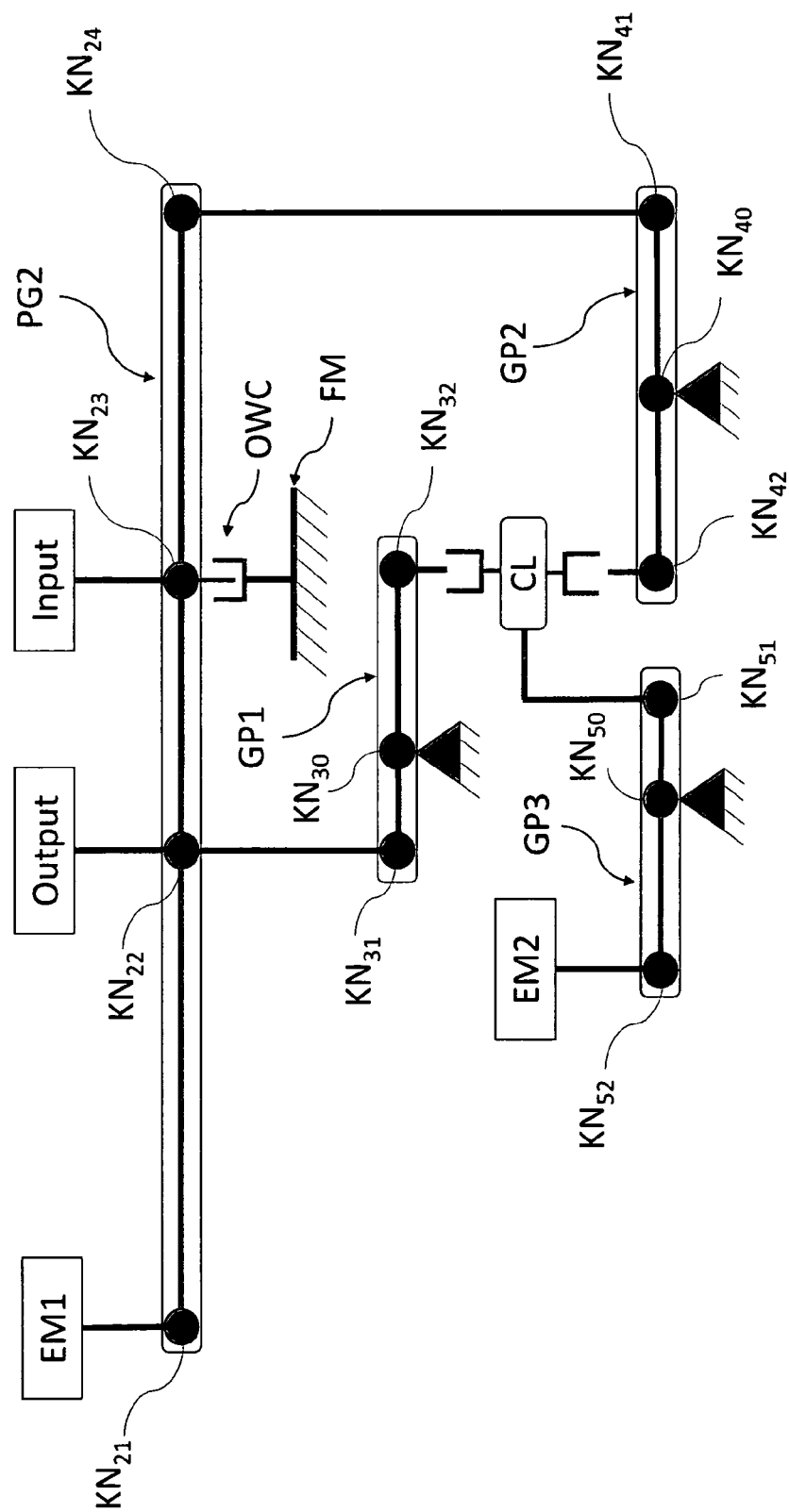
FIG. 15 is a schematic lever diagram of another preferred embodiment (embodiment 2) of multi-mode electro-mechanical variable speed transmission of the current invention.

FIG. 15 shows another embodiment (embodiment 2) in a lever diagram format. The major difference of the this embodiment in comparison with the first embodiment shown in FIGS. 4 to 9 resides in the replacement of the first planetary gear set (PG1) with three pairs of external meshing gears represented respectively three two-knot levers (GP1, GP2 and GP3).

As shown in FIG. 15, the second embodiment of the multi-mode electro-mechanical variable speed transmission is comprised of a planetary gear set (PG2) represented by a four-knot lever diagram having a first co-axial rotatable component ($KN_{21}$), a second co-axial rotatable component ($KN_{22}$), a third co-axial rotatable component ($KN_{23}$) and a fourth co-axial rotatable component ($KN_{24}$), a first pair of external meshing gears represented by a first two-knot lever (GP1), a second pair of external meshing gears represented by a second two-knot lever (GP2) and a third pair of external meshing gears represented by a third two-knot lever (GP3). The first two-knot lever (GP1) includes a first and second knots ($KN_{31}$ and $KN_{32}$) representing two rotatable external meshing gears. The second two-knot lever (GP2) includes a first and a second knots ($KN_{41}$ and $KN_{42}$) representing two rotatable meshing gears. The third two-knot lever (GP3) includes a first and second knots ($KN_{51}$ and $KN_{52}$) representing two rotatable meshing gears. This embodiment further includes an input shaft (Input), an output system (Output), at least one torque transfer device (CL), and a first and a second electric machines (EM1, EM2) along with their associated drives and controllers.

The first knot ($KN_{31}$) of the first two-knot lever (GP1) connects to the second knot ($KN_{22}$) of the planetary gear set (PG2); the first knot ($KN_{41}$) of the second two-knot lever (GP2) connects to the fourth knot ($KN_{24}$) of the planetary gear set (PG2); the first knot ($KN_{51}$) of the third two-knot lever (GP3) connects to the at least one torque transfer device (CL).

The first electric machine (EM1) connects to the first knot ($KN_{21}$) of the planetary gear set (PG2); the output system couples to the second knot ($KN_{22}$) of the planetary gear set (PG2); the input shaft connects to the third knot ($KN_{23}$) of the planetary gear set (PG2); the second electric machine connects to the second knot ($KN_{52}$) of the third two-knot lever (GP3), and can be selectively coupled via the at least one clutch (CL) to the second knot ($KN_{22}$) of the planetary gear set (PG2) through the first two-knot lever (GP1) or to the fourth knot ($KN_{24}$) of the planetary gear set (PG2) through the second two-knot lever (GP2).

The at least one torque transfer device (CL) includes a neutral position where the second electric machine can be shifted to a freewheeling state.

The embodiment of the multi-mode electro-mechanical variable speed transmission shown in FIG. 15 further includes a stationary member (FM) and a second torque transfer device (OWC). The second torque transfer device is a one-way clutch (OWC). The one-way clutch (OWC) selectively connects the stationary member (FM) to the third knot ($KN_{23}$) of the planetary gear set (PG2). The one-way clutch prevents the input shaft (Input) from rotating in the reverse direction and provide reaction torque to balance the drive torque of the first electric machine (EM1) when it acts as motor during one of the pure electric drive modes.

Figure 16:
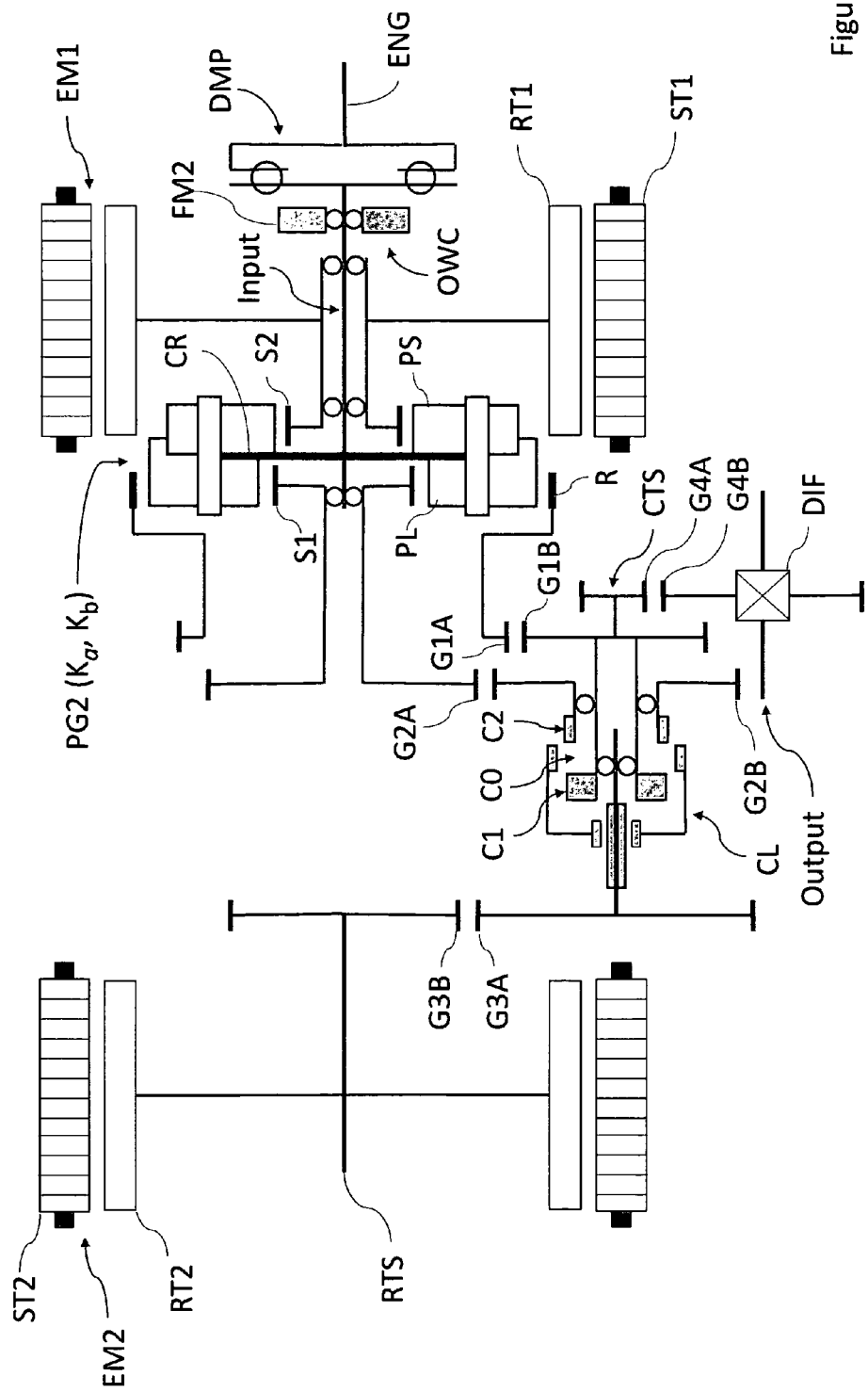
FIG. 16 is a component schematic diagram of the embodiment shown in FIG. 15 (embodiment 2) of multi-mode electro-mechanical variable speed transmission of the current invention.

FIG. 16 shows the same embodiment as illustrated in FIG. 15 in component schematic diagram wherein the knots of the lever diagrams are represented by actual components of the corresponding gear sets. The multi-mode electro-mechanical variable speed transmission is comprised of a planetary gear set (PG2) including four-coaxial rotatable components, a first pair of external meshing gears (G1A and G1B), a second pair of external meshing gears (G2A and G2B), a third pair of external meshing gears (G3A and G3B), an input shaft (Input), an output system (Output), a first torque transfer device or a clutch (CL), a second torque transfer device (OWC), a stationary member (FM), a first electric machine (EM1) and a second electric machine (EM2). The transmission may also include a torsional damper (DMP) to connect the input shaft (Input) to the engine output shaft (ENG) and a counter shaft system (CTS) to connect the planetary gear set (PG2) to the output system (Output).

The planetary gear set (PG2) is a Ravigneaux planetary gear-train. It includes a first sun gear (S1), a second sun gear (S2), a ring gear (R), a first set of planet gears (PS), a second set of planet gears (PL), and a planet carrier (CR) that hosts and supports the first and second sets of planet gears (PS, PL). The planet gears in the first set are short planet gears and the planet gears in the second set are long planet gears. Each of the long planet gears (PL) is in internal meshing engagement with the ring gear (R) and in external meshing engagement with the first sun gear (S1); each of the short planet gears (PS) is in external meshing engagement with a corresponding long planet gear (PL) and with the second sun gear (S2). The second sun gear (S2), the ring gear (R), the planet carrier (CR) and the first sun gear (S1) form the four co-axial rotatable components of the planetary gear set (PG2) and are represented respectively as the first knot ($KN_{23}$), the second knot ($KN_{22}$), the third knot ($KN_{23}$) and the fourth knot ($KN_{24}$) on a four-knot lever diagram. The planetary gear set is characterized by two gear teeth ratios $K_a$ and $K_b$.

$$K_a = \frac{Z_{S1}}{Z_R}; K_b = \frac{Z_{S1}}{Z_{S2}}$$

where $Z_{s1}$, $Z_{s2}$ and $Z_R$ are the tooth numbers of the first sun gear (S1), the second sun gear (S2) and the gear (R) of the planetary gear set (PG2), respectively. On the four-knot lever diagram, $K_a$ and $K_b$ are denoted as the inter-distance between the second and third knots and the inter-distance between the first and third knots, respectively.

The first pair of meshing gears includes a drive gear (G1A) and a driven gear (G1B) represented by the first knot ($KN_{31}$) and the second knots ($KN_{32}$) on the first two-knot lever (GP1), respectively. The gear teeth ratio of driven gear to drive gear for the first gear pair is GR1. The second pair of meshing gears includes a drive gear (G2A) and a driven gear (G2B) represented by the first knot ($KN_{41}$) and the second knots ($KN_{42}$) on the second two-knot lever (GP2), respectively. The gear teeth ratio of driven gear to drive gear for the second gear pair is GR2. The third pair of meshing gears includes a drive gear (G3A) and a driven gear (G3B) represented by the first knot ($KN_{51}$) and the second knots ($KN_{52}$) on the third two-knot lever (GP3), respectively. The gear teeth ratio of driven gear to drive gear for the third gear pair is GR3.

The first torque transfer device (CL) includes a neutral position (C0) and at least two engagement positions (C1 and C2).

The first electric machine includes a first rotor (RT1) and a first stator (ST1). The first rotor (RT1) of the first electric machine connects the second sun gear (S2) of the planetary gear set (PG2). The output system (Output) couples to the ring gear (R) of the planetary gear set (PG2) through the first pair of meshing gears (G1A and G1B). The input shaft (Input) couples to the crank shaft of the engine though a damper (DMP) at one end and connects to planet carrier (CR) of the planetary gear set (PG2) at the other end.

The second electric machine (EM2) includes a second rotor (RT2) and a second stator (ST2). The second rotor (RT2) of the second electric machine (EM2) couples selectively via the at least two engagement positions (C1, C2) of the first torque transfer device (CL) to the ring gear (R) of the planetary gear set (PG2) through the first and third pairs of meshing gears with a first speed ratio, or to the first sun gear of the planetary gear set through the second and third pairs of meshing gears with a second speed ratio. When the first torque transfer device (CL) is at the neutral position (C0), the second electric machine (EM2) is set to a freewheeling state where speed of rotor (RT2) can be independently controlled to facilitate mode shifting between different operating modes of the transmission.

The second embodiment as shown in FIGS. 15 and 16 provides that same functions and performance characteristics as the first embodiment. Both embodiments share essentially the same mode shifting procedure. That is to say the mode shifting procedure described in FIG. 14 for the first embodiment applies to the second embodiment.

Figure 17:
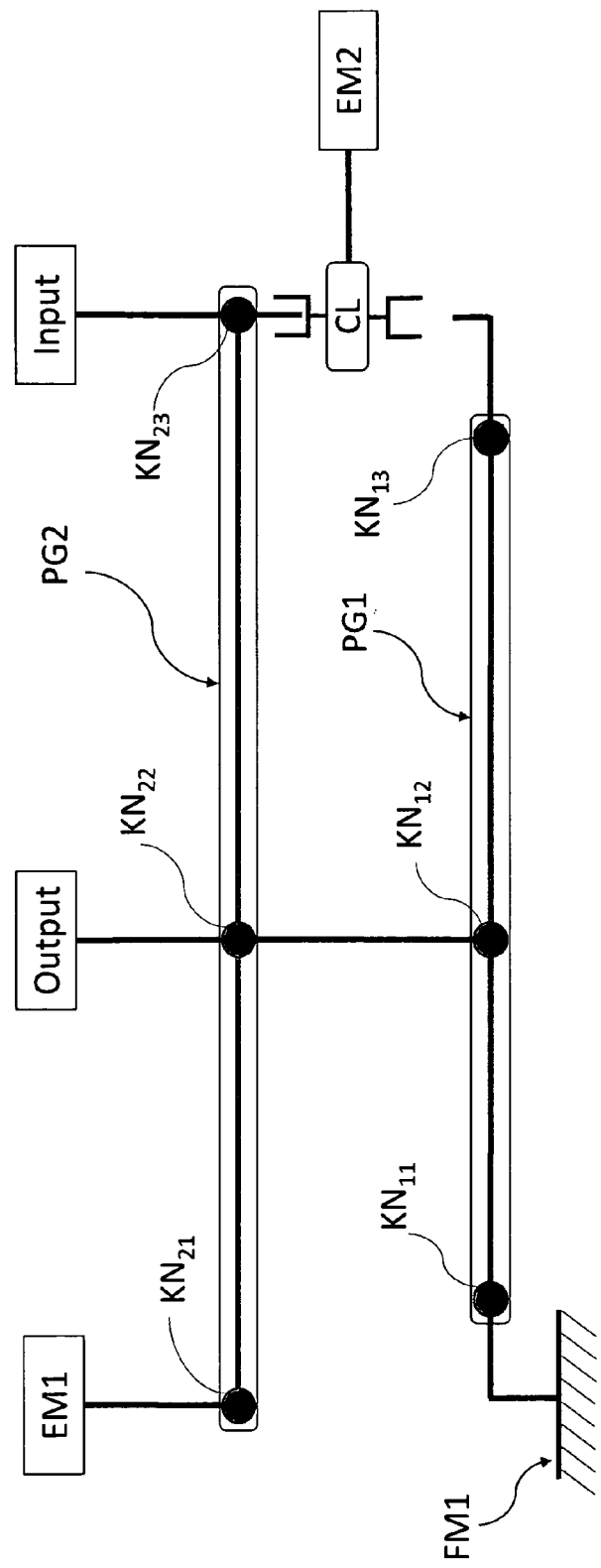
FIG. 17 is a schematic lever diagram of another preferred embodiment (embodiment 3) of multi-mode electro-mechanical variable speed transmission of the current invention, showing the operation in the first power split mode.

FIG. 17 shows another embodiment (embodiment 3) in a lever diagram format. Referring to FIG. 17, the multi-mode electro-mechanical variable speed transmission is comprised of a gear system including a first planetary gear set (PG1) represented by a first lever and a second planetary gear set (PG2) represented by a second lever, an input shaft (Input), an output system (Output), at least one torque transfer device (CL) including a neutral position, a first stationary member (FM1), and a first and a second electric machines (EM1, EM2) along with their associated drives and controllers. The first planetary gear set is a three-branch planetary gear, having a first co-axial rotatable component, a second co-axial rotatable component and a third co-axial rotatable component each being represented by a first knot ($KN_{11}$), a second knot ($KN_{12}$) and a third knot ($KN_{13}$) of the first lever (PG1), respectively. The first lever is fully defined by its characteristic parameter $K_{S1}$. The second planetary gear set (PG2) is also a three-branch planetary gear set, having a first, a second, and a third co-axial rotatable components that are represented by a first knot ($KN_{21}$), a second knot ($KN_{22}$), and a third knot ($KN_{23}$) of the second lever (PG2), respectively. The second lever is fully defined by its characteristic parameter $K_{S2}$. The first knot ($KN_{11}$) of the first lever (PG1) connects to the stationary member (FM1). The second knot ($KN_{12}$) of the first lever (PG1) connects to the second knot ($KN_{22}$) of the second lever (PG2) such that the second knot ($KN_{12}$) of the first lever (PG1) rotates at the same rotational speed as the second knot ($KN_{22}$) of the second lever (PG2).

The first electric machine (EM1) includes a first rotor and a first stator. The rotor of the first electric machine (EM1) directly couples to the first knot ($KN_{21}$) of the second planetary gear set (PG2). The output shaft (Output) couples to the second knot ($KN_{12}$) of the first planetary set (PG1) and to the second knot ($KN_{22}$) of the second planetary gear set (PG2). The input shaft (Input) couples to the third knot ($KN_{23}$) of the second planetary gear set (PG2).

The second electric machine (EM2) includes a second rotor and a second stator. The rotor of the second electric machine (EM2) couples selectively through the torque transfer device (CL) to the third knot ($KN_{13}$) of the first planetary gear set (PG1) or to the third knot ($KN_{23}$) of the second planetary gear set (PG2). It can also be set to a freewheeling state by the torque transfer device (CL) via the neutral position. Thus, the second electric machine (EM2) selectively either connects directly to the third knot ($KN_{23}$) of the second planetary gear set with a first constant speed ratio (1 to 1 ratio), or connects indirectly through the first planetary gear set (PG1) to the second knot ($KN_{22}$) of the second planetary gear set (PG2) with a second constant speed ratio wherein the first and second constant speed ratios are different.

Figure 19:
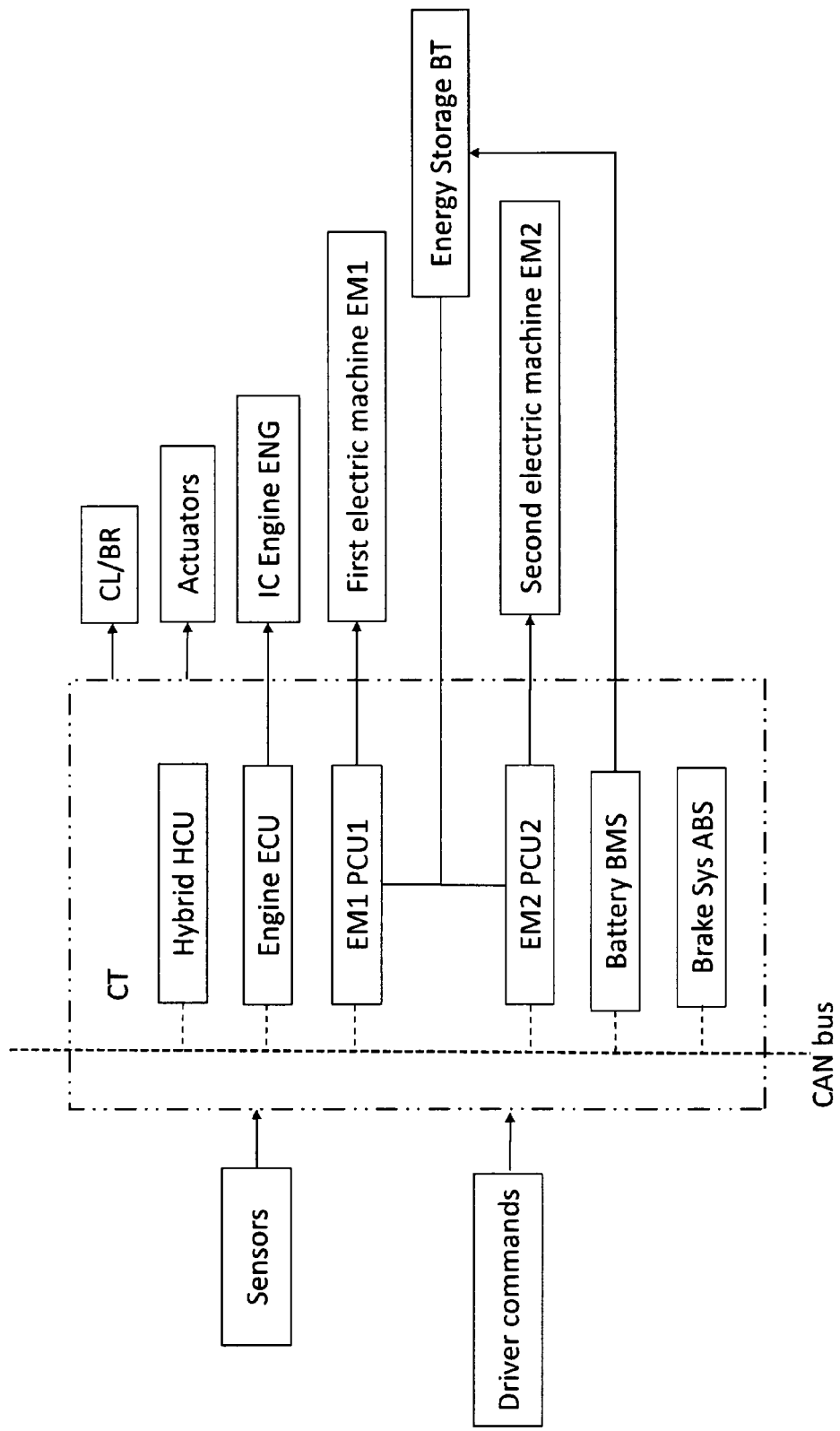
FIG. 19 is a block diagram according to an embodiment of the invention.

The first and second electric machines (EM1, EM2), along with their respective drives, are electrically connected to an energy storage device such as a battery pack (BT) to receive power from or deliver power to the energy storage device as shown in FIG. 19.

When the second electric machine (EM2) couples to the first planetary gear set (PG1), the at least one torque transfer device (CL) connects the second electric machine EM2 to the third knot ($KN_{13}$) of the first planetary gear set (PG1) and disconnect the second electric machine (EM2) from the third knot ($KN_{23}$) of the second planetary gear set (PG2) as shown in FIG. 17. The transmission is operated under a first power split mode. The input power from the engine is split into two power paths to transmit to the output system. One is the pure mechanical power path that goes from the input shaft (Input), through the second knots ($KN_{12}$, $KN_{22}$) of the first and second planetary gear sets (PG1, PG2), to the output system (Output). The other is the electro-mechanical power path that goes from input shaft (Input), through the second planetary gear set (PG2), the first electric machine (EM1), the second electric machine (EM2), the torque transfer device (CL) and the first planetary gear set (PG1), to the output system (Output).

Figure 18:
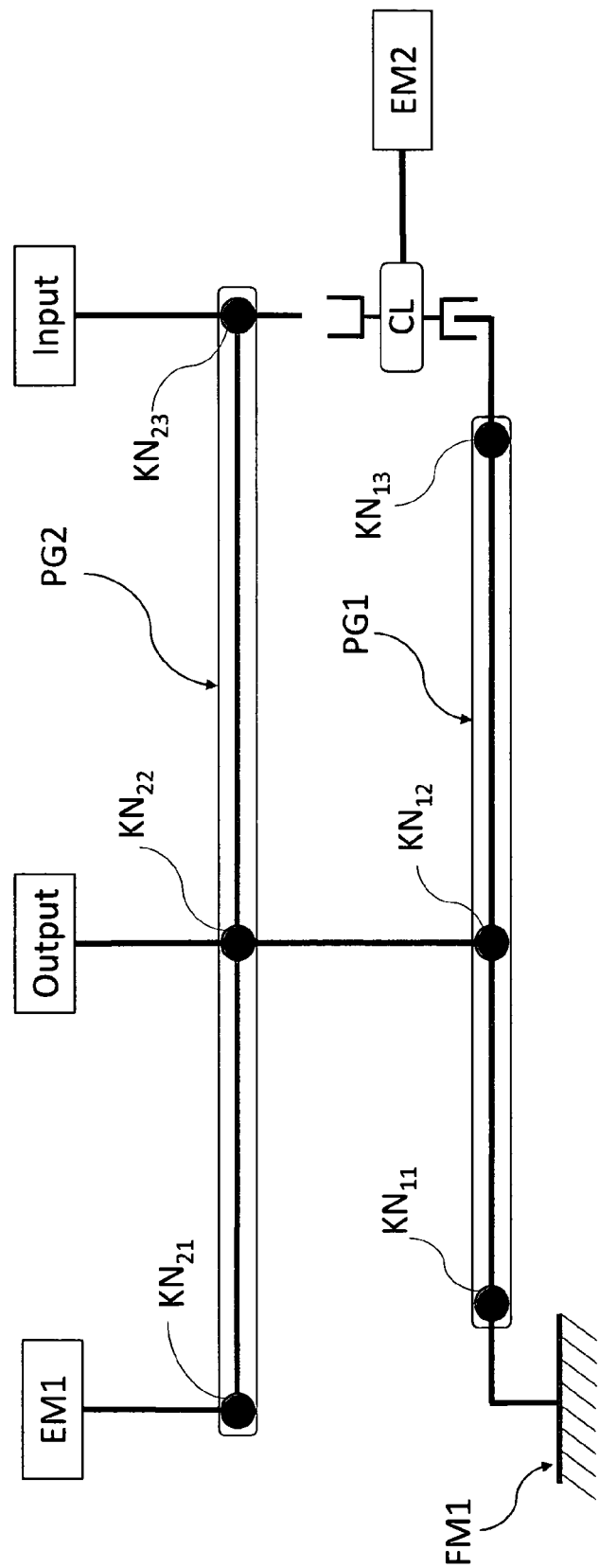
FIG. 18 is a schematic lever diagram of the preferred embodiment of FIG. 17 (embodiment 3), showing the operation in the second power split mode.

When the second electric machine (EM2) couples to the second planetary gear set (PG2), the at least one torque transfer device (CL) disconnects the second electric machine (EM2) from the third knot ($KN_{13}$) of the first planetary gear set (PG1) and connects it to the third knot ($KN_{23}$) of the second planetary gear set (PG2) as shown in FIG. 18. The transmission is operated under a second power split mode. Similarly, the input power from the engine is split into two power paths to transmit to the output system (Output). The pure mechanical power path goes from the input shaft (Input) through the second planetary gear set (PG2) to the output system (Output); the electro-mechanical power path goes from the input shaft (Input), through the second planetary gear set (PG2), the first electric machine (EM1), the second electric machine (EM2), and the at least one torque transfer device (CL) back to the second planetary gear set (PG2), and finally to the output system (Output).

The third embodiment (embodiment 3) is capable of providing a natural speed ratio node SR0 where the speed of the output shaft system and speeds of the first and second electric machines are zero, and a regular speed ratio node SR1 where the speed of the first electric machine is zero. The natural speed ratio node SR0 divides the entire speed ratio range into a forward speed ratio range and a reverse speed ratio range. Above the natural speed ratio node is the forward range; below the natural speed ratio node is the reverse range. The first regular speed ratio node SR1, also referred to as the first speed ratio node, further divides the forward range into a low-speed ratio range and a high-speed ratio range. Below the first speed ratio node SR1 is the low-speed ratio range and above the first speed ratio node SR1 is the high-speed ratio range.

At the first speed ratio node SR1, the torque of the second electric machine (EM2) is zero if there is no net power exchange between the transmission and the energy storage device. Thus, it would be advantageous to choose SR1 as the nominal shifting point between the two different power split modes of operation for the transmission. In the low-speed ratio range below SR1, the transmission adopts the so-called output power split configuration. In the high-speed ratio range above SR1, the transmission adopts the so-call input power split configuration. To reduce hunting about the nominal shifting point, a buffer zone SR1±ΔSR, is introduced. For upshifting the actual shifting point is set to be higher than SR1 by amount of ΔSR. That is to say at a speed ratio of SR1+ΔSR. For downshift the actual shifting point is set to be lower than SR1 by ΔSR. That is to say at a speed ratio of SR1−ΔSR. The shifting procedure described in FIG. 14 is also applicable to the third embodiment.

In the reverse range, the transmission operates under pure electric drive mode. Thus, the power in each power path, whether in the mechanical power path or in the electro-mechanical power path, is always less than the power transmitted through the transmission from the input shaft to the output system. No internal power circulation exists in any speed ratio range for the multi-mode electro-mechanical variable speed transmission. The operable speed ratio range of the transmission is thus effectively extended.

To ensure speed synchronization of the torque transfer device (CL) at the nominal mode shifting point SR1, the following relationship between the gear ratios has to be satisfied as closely as possible, $$K_{S1}=K_{S2} \tag{8}$$

Taking into consideration of possible internal power losses of the electric machines and the associated drives, and the consideration of constraints imposed by gear teeth numbers, the actual shifting point $SR_b$ in speed ratio may be at the vicinity of SR1 deviating from SR1. To ensure clutch rotational speed synchronization at the nominal shifting speed ratio $SR_b$, the gear ratios have to satisfy following relationship $$SR_b = \frac{1}{1+K_{S1}} \tag{9}$$

A common feature of all the embodiments and variants disclosed above is that the first electric machine (EM1), the input shaft (Input) and the output system (Output) each couples to a different knot of a planetary gear set (PG2) with a constant speed ratio. Another common feature of all the embodiments and variants is that the second electric machine (EM2) selectively couples to one knot of the planetary gear set (PG2) with a first constant speed ratio and to another knot of the planetary gear set (PG2) with a second constant speed ratio. Other common features of all the embodiments and variants are that shifting between two different hybrid operating modes is achieved via the neutral position (C0) of the at least one torque transfer device (CL) where the second electric machine (EM2) is set to a free-wheeling state and where the second electric machine can be controlled independently to actively synchronize with one of the at least two engagement positions (C1 or C2) of the torque transfer device (CL), that the torque transfer device (CL) is unloaded during mode shifting, and that engine power is adjusted according to transmission speed ratio SR in relation to the first speed node SR1 to keep the drive torque and output power of the transmission substantially undisturbed during mode shifting.

The basic steps in designing and producing the transmission of the current invention include constructing a planetary gear set having at least three branches; producing an input shaft, an output system, at least one torque transfer device, a first electric machine and a second electric machine; connecting the each of the at least three branches of the planetary gear set to the first electric machine, the output system and the input shaft, respectively; selectively coupling the second electric machine through the torque transfer device to one branch of the planetary gear set with a first constant speed ratio and to another branch of the planetary gear set with a second constant speed ratio.

Operating and controlling the transmission of the current invention include shifting between different modes of operation by means of unloading the torque transfer device, means of setting one of the electric machines to a freewheeling state, means of synchronizing the electric machine in freewheeling state with one of the engagement positions of the torque transfer device, and means of adjusting engine power or/and torque such that output torque and power from the transmission remain undisturbed during mode shifting.

When four-branch planetary gear set is used in constructing the transmission of the current invention, restrictions are imposed on the structure and the characteristic parameters of the four-branch gear system. This is done to ensure that the four-branch gear system so constructed is suitable to produce a multi-mode electro-mechanical variable speed transmission that is capable of satisfying all specified functional requirements. The aforementioned inequality Equation (7) sets forth the power constraints for electric machines from the power matching perspective. It is recommended that following condition be satisfied when designing and selecting characteristic parameters for a four-branch gear system.

$$\frac{K_b(K_a+1)}{K_b-K_a} \leq 2.75 \tag{10}$$

Additionally, for restricting the rotational speed of electric machines, particularly at high-speed range, it is further recommended that the following relationship holds true.

$$K_b \leq 2 \tag{11}$$

It should be pointed out that the electric machine referred in this disclosure is a generic term; it refers to both electric motor and electric generator.

FIG. 19 is a block diagram showing a controller (CT) along with its periphery devices and components including the IC engine (ENG), the two electric machines of the transmission (EM1, EM2), the energy storage device (BT), sensors and actuators (including CL and BR). The controller (CT) includes a hybrid control unit (HCU) for the hybrid powertrain, an engine controller (ECU) for the engine (ENG), drives (PCU1 and PCU2) for each of the first electric machine (EM1) and the second electric machine (EM2), an energy management system (BMS) for the energy storage device such as a battery pack (BT) and a controller for the brake (BR) for the braking system of the vehicle The drives (PCU1, PCU2) include controllers and inverters. The energy storage device or the battery pack (BT) is connected to each of the first electric machine and the second electric machine. As stated above, the first and second electric machines (EM1, EM2) are electrically connected to transmit power to and from each other and are connected to the energy storage device (BT) to receive power from the energy storage device or deliver power to the energy storage device, as required. The controller (CT) receives signals from various sensors and commands from the driver; it includes a processor or processors and memory devices for carrying out and storing above-described procedures or algorithms and for effecting the above-described controls of the transmission, including controlling the first and second electric machines (EM1, EM2), the engine (ENG), the clutch (CL), the brake (BR), and the energy storage device (BT). The individual drives (PCU1, PCU2) for the first and second electric machines (EM1, EM2) and the engine controller (ECU) may comprise separate controlling circuits or may be part of a single overall controlling circuit.

The controller (CT) and its periphery devices and components shown in FIG. 19 constitute the means for unloading torque transfer device, the means for setting and adjusting engine power, the means for setting and adjusting engine speed and torque, the means for shifting one of the electric machines to freewheeling state, the means for setting and controlling the speed of one of the electric machines independently from the other electric machine, and the means for actively synchronizing the speed of one of the electric machines with the speed of one of the engagement positions of the torque transfer device.

INDUSTRIAL USEFULNESS

The parts and components required by the aforementioned embodiments and variants of current invention can be readily made by industrial manufacturing means. This warrants that the multi-mode electro-mechanic variable speed transmission is obtainable. The transmission can be operated under at least two different power split modes, and thus is capable of avoiding internal power circulation and offering higher power transmission efficiency. Smooth, continuous and non-power interruptive shifting between different operation modes can be achieved through use of simple, more efficient and low cost positive engagement type of clutches. This enables the transmission to provide, in a wide range, independent and continuous output-to-input speed ratio change and power regulation, thus extending significantly operable range. The new multi-mode electro-mechanical variable speed transmission reduces power demand on electric machines, making the construction of the transmission simple, more compact, and low cost. The transmission is capable of proving continuous speed change from reverse to full stop and to forward, without the need for vehicle launching device. It significantly improves the overall fuel efficiency of the vehicle.

The invention claimed is:

1. A multi-mode electro-mechanical variable speed transmission comprising:
    a gear system with at least one planetary gear set having at least a first co-axial rotatable component, a second co-axial rotatable component, and a third co-axial rotatable component;
    an input shaft, connectable to an engine
    an output system including at least one drive shaft;
    a first electric machine having a rotor and a stator;
    a second electric machine having a rotor and a stator;
    at least one torque transfer device having a neutral position in which said second electric machine is in a freewheeling state; and
    means for setting and controlling a rotor speed of said second electric machine in the freewheeling state;
    wherein said first electric machine connects to said first co-axial rotatable component of said at least one planetary gear set,
    said output system connects to said second co-axial rotatable component of said at least one planetary gear set, said input shaft connects to said third co-axial rotatable component of said at least one planetary gear set, and said second electric machine connects selectively through said at least one torque transfer device to one of said co-axial rotatable components of said at least one planetary gear set with a first speed ratio, and to another of said co-axial rotatable components of said at least one planetary gear set with a second speed ratio, wherein the first and second speed ratios are different.

2. The multi-mode electro-mechanical variable speed transmission according to claim 1, wherein said at least one torque transfer device further includes a first engagement position and a second engagement position, and said transmission further comprises:

means for actively synchronizing the rotor speed of said second electric machine with the speed of said first engagement position, or the speed of said second engagement position.

3. The multi-mode electro-mechanical variable speed transmission according to to claim 1, further comprising:

means for unloading said at least one torque transfer device such that the engagement or disengagement process of said torque transfer device is carried out under substantially zero torque load.

4. The multi-mode electro-mechanical variable speed transmission according to to claim 1, wherein said transmission is connectable to an engine and is capable of operating under different power-split modes, said transmission further comprising:

means for setting and adjusting engine power during mode shifting such that the output torque and power from said transmission are substantially undisturbed.

5. The multi-mode electro-mechanical variable speed transmission according to to claim 1, further comprising:

an energy storage device for supplying power to and receiving power from said electric machines; and means for setting and adjusting engine power with respect to the power of said energy storage device in accordance with output-to-input speed ratio of said transmission.

6. The multi-mode electro-mechanical variable speed transmission according to claim 4, wherein said transmission has a first speed ratio node defined as the output-to-input speed ratio of said transmission where the rotation speed of said first electric machine is zero; and wherein said means for setting and adjusting engine power further sets the power ratio of the engine to vehicle motive power to be directly proportional to the first speed ratio node and inversely proportional to the output-to-input speed ratio of said transmission.

7. The multi-mode electro-mechanical variable speed transmission according to claim 1, wherein said transmission has a first speed ratio node defined as the output-to-input speed ratio of said transmission where the rotation speed of said first electric machine is zero; said transmission further comprising:

a battery for supplying power to and receiving power from at least one of said first and second electric machines;

means for unloading said at least one torque transfer device such that the engagement or disengagement process of said torque transfer device is carried out under substantially zero torque load; and means for setting and adjusting engine power during mode shifting such that the power ratio of said battery motive power to the engine motive power is in direct proportion to speed ratio deviation with respect to the first speed ratio node of said transmission, and that the output torque and power from said transmission are substantially undisturbed.

8. The multi-mode electro-mechanical variable speed transmission according to to claim 1, wherein said transmission has a first speed ratio node defined as the output-to-input speed ratio of said transmission where the rotation speed of said first electric machine is zero, said transmission further comprising:

a battery for supplying power to and receiving power from at least one of said first and second electric machines;

means for unloading said at least one torque transfer device such that the engagement or disengagement of said torque transfer device is carried out under substantially zero torque load; and means for setting and controlling engine speed and torque along a predetermined engine operating curve in coordination with the process of unloading said at least one torque transfer device from torque load during mode shift such that the output torque and power from said transmission are substantially undisturbed.

9. The multi-mode electro-mechanical variable speed transmission according to claim 8, wherein said means for setting and controlling engine speed and torque produces an engine power such that the power ratio of battery to engine is in direct proportion to speed ratio deviation with respect to the first speed ratio node of said transmission.

10. The multi-mode electro-mechanical variable speed transmission according to claim 9, wherein said at least one torque transfer device further includes a first and second engagement positions; and said means for setting and controlling the speed of said second electric machine in the freewheeling state further actively synchronizes the rotor speed of said second electric machine with the speed of one of said first and second engagement positions.

11. The multi-mode electro-mechanical variable speed transmission according to claim 1, wherein said gear system includes another planetary gear set; wherein the second electric machine selectively couples in a direct connection to one of said co-axial rotatable components of said at least one planetary gear set with a first speed ratio, and in an indirect connection through said another planetary gear set to another co-axial rotatable component of said at least one planetary gear set with a second speed ratio; the first and second speed ratios are different.

12. The multi-mode electro-mechanical variable speed transmission according to claim 11, wherein said at least one planetary gear set is a four-branch planetary gear set having said first co-axial rotatable component, said second co-axial rotatable component, said third co-axial rotatable component, and a fourth co-axial rotatable component; said another planetary gear set includes at least two co-axial rotatable components, said second electric machine selectively couples in a direct connection to said fourth co-axial rotatable component of said four-branch planetary gear set with a first constant speed ratio, and in an indirect connection through said another planetary gear set to said second co-axial rotatable component of said four-branch planetary gear set with a second speed ratio; and wherein the first and second speed ratios are different.

13. The multi-mode electro-mechanical variable speed transmission according to claim 12, further comprising means for setting and controlling the speed of said second electric machine to synchronize the rotor speed of said second electric machine with the speed of one of the four co-axial rotatable components of said four-branch planetary gear set or the speed of one of said at least two co-axial rotatable components of said another planetary gear set.

14. The multi-mode electro-mechanical variable speed transmission according to claim 12, further comprising a first stationary member; wherein said another planetary gear set is a three-branch planetary gear set having a first co-axial rotatable component, a second co-axial rotatable component, and a third co-axial rotatable component; said first co-axial rotatable component of said three-branch planetary gear set couples to said first stationary member; said second co-axial rotatable component of said three-branch planetary gear set couples to said second co-axial rotatable component of said four-branch planetary gear set; and
  means for selectively synchronizing the speed of said second electric machine with and coupling said second electric machine to said third co-axial rotatable component of said three-branch planetary gear set, or synchronizing the speed of said second electric machine with and coupling said second electric machine to said fourth co-axial rotatable component of said four-branch planetary gear set.

15. The multi-mode electro-mechanical variable speed transmission according to claim 14, further comprising a second torque transfer device and a second stationary member; said second torque transfer device conditionally couples said input shaft and said third co-axial rotatable component of said four-branch planetary gear set to said second stationary member.

16. The multi-mode electro-mechanical variable speed transmission according to claim 14, further comprising another torque transfer device and another stationary member; wherein said another torque transfer device selectively couples said fourth co-axial rotatable component of said four-branch planetary gear set to said another stationary member.

17. The multi-mode electro-mechanical variable speed transmission according to claim 15, wherein said first torque transfer device is a dog-clutch having a neutral position and at least two engagement positions; and said second torque transfer device is a one-way clutch capable of providing reaction torque to said at least one planetary gear set and preventing said input shaft from rotating in a reverse direction.

18. The multi-mode electro-mechanical variable speed transmission according to claim 11, wherein said at least one planetary gear set and said another planetary gear set are co-axially aligned and positioned adjacent to each other along the axial direction.

19. The multi-mode electro-mechanical variable speed transmission according to claim 1, wherein the maximum continuous power rating of said first electric machine and said second electric machines is $P_{em}$, the maximum power at said input shaft is $P_{in}$; said at least one planetary gear set is a four-branch planetary gear set represented by a four-knot lever diagram having a first, a second, a third and a fourth knot, wherein the inter-distance between the first and third knots measures $K_b$ units, the inter-distance between the second and third knots measures $K_a$ units, the inter-distance between the third and the fourth knots is a unit; and the characteristic parameters of said four-branch planetary gear system $K_a$, $K_b$ satisfy following relationship:

$$\frac{K_b(K_a+1)}{K_b - K_a} \le \left(\frac{1 + \frac{P_{em}}{P_{in}}}{1 - \frac{P_{em}}{P_{in}}}\right)^2.$$

20. The multi-mode electro-mechanical variable speed transmission according to claim 1, wherein said at least one planetary gear set is a four-branch planetary gear set having a first co-axial rotatable component, a second co-axial rotatable component, a third co-axial rotatable component and a fourth co-axial rotatable component; said four-branch planetary gear set is represented by a four-knot lever diagram having a first, a second, a third and a fourth knot, wherein the inter-distance between the first and third knots measures $K_b$ units, the inter-distance between the second and third knots measures $K_a$ units, the inter-distance between the third and the fourth knots is a unit; the characteristic parameters of said four-branch planetary gear system $K_a$, $K_b$ satisfy following relationships, $$\frac{K_b(K_a+1)}{K_b - K_a} \le 2.75;$$

$$K_b \le 2.$$

21. The multi-mode electro-mechanical variable speed transmission according to claim 1, wherein said at least one torque transfer device has at least three engagement positions, and said engagement positions are aligned adjacent to each other along an axial direction.

22. A method of designing, producing and operating a multi-mode electro-mechanical variable speed transmission operable under multiple modes operation comprising:
  designing and producing a gear system including at least one planetary gear set, said planetary gear set including at least a first co-axial rotatable component, a second co-axial rotatable component and a third co-axial rotatable component;
  designing and producing an input shaft connectable to an engine, an output system, at least one torque transfer device, a first electric machine and a second electric machine, said output system includes at least one drive shaft, said at least one torque transfer device having at least one neutral position for shifting said second electric machine to a freewheeling state;
  coupling the first electric machine to the first co-axial rotatable component of the at least one planetary gear set;
  coupling the output system to the second co-axial rotatable component of the at least one planetary gear set;
  coupling the input shaft to the third co-axial rotatable component of the at least one planetary gear set;
  selectively coupling the second electric machine to one of the co-axial rotatable components of the at least one planetary gear;
  operating the transmission in different modes of operation;
  setting a target speed for the second electric machine;
  controlling the speed of the second electric machine independently from the first electric machine; and
  shifting the transmission between different modes of operation.

23. The method of designing, producing and operating a multi-mode electro-mechanical variable speed transmission according to claim 22, further comprising:
  unloading said at least one torque transfer device; and
  adjusting engine power according to output-to-input speed ratio of said transmission.

24. The method of designing, producing and operating a multi-mode electro-mechanical variable speed transmission according to claim 22, further comprising:

shifting the second electric machine to the freewheeling state where it is not coupled to any of the co-axial rotatable components of the at least one planetary gear set; and controlling the rotor speed of the second electric machine to actively synchronize it with said target speed while the second electric machine is in the freewheeling state.

25. The method of designing, producing and operating a multi-mode electro-mechanical variable speed transmission according to claim 22, wherein said at least one torque transfer device further includes at least two engagement positions; and said shifting the transmission between different modes of operation includes steps of:
  a) checking shifting criteria;
  b) unloading said at least one torque transfer device;
  c) calculating speed ratio deviation or normalized speed ratio with respect to the first speed ratio node and adjusting engine power based on the speed ratio deviation or the normalized speed ratio;
  d) shifting the second electric machine to freewheeling state where the second electric machine is not coupled to any co-axial rotatable member of the at least one planetary gear set;
  e) controlling the rotor speed of the second electric machine such that the speed at the intended engagement position of the at least one torque transfer device synchronizes with the speed of the one of the co-axial rotatable components of the at least one planetary gear set to which said engagement position is intended to connect; and
  f) coupling the second electric machine to the intended one of the co-axial rotatable components of the at least one planetary gear set.

26. The multi-mode electro-mechanical variable speed transmission according to claim 1, wherein said transmission is connectable to an engine and is capable of operating under different power-split modes, said transmission further comprising:
  means for setting and adjusting engine torque during mode shifting such that the ratio of engine torque to drive torque at output shaft is substantially proportional to the first speed ratio node SR1.

27. A multi-mode electro-mechanical variable speed transmission comprising:
  a gear system includes at least one planetary gear set having at least a first co-axial rotatable component, a second co-axial rotatable component, and a third co-axial rotatable component;
  an input shaft connectable to an engine;
  an output system including at least one drive shaft;
  a first electric machine having a rotor and a stator;
  a second electric machine having a rotor and a stator;
  at least one torque transfer device having a neutral position for shifting the second electric machine to a freewheeling state;
  a means for setting and adjusting engine power during mode shifting such that the output torque and power from said transmission are substantially undisturbed;
  said first electric machine connects to the first co-axial rotatable component of the at least one planetary gear set;
  said output system connects to the second co-axial rotatable component of the at least one planetary gear set;
  said input shaft connects to the third co-axial rotatable component of the at least one planetary gear set;
  said second electric machine connects to one of the co-axial component of the at least one planetary gear set with a constant speed ratio, and couples selectively to another co-axial component of the at least one planetary gear set.

* * * * *